(12) United States Patent
Choi et al.

(10) Patent No.: US 10,547,945 B2
(45) Date of Patent: *Jan. 28, 2020

(54) PANEL VIBRATION TYPE SOUND GENERATING DISPLAY DEVICE

(71) Applicant: LG DISPLAY CO., LTD., Seoul (KR)

(72) Inventors: YeongRak Choi, Gyeonggi-do (KR); KwanHo Park, Incheon (KR); Sungtae Lee, Incheon (KR)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/038,075

(22) Filed: Jul. 17, 2018

(65) Prior Publication Data
US 2018/0343522 A1    Nov. 29, 2018

Related U.S. Application Data

(63) Continuation of application No. 15/471,458, filed on Mar. 28, 2017, now Pat. No. 10,129,646.

(30) Foreign Application Priority Data

Mar. 28, 2016  (KR) .................. 10-2016-0037118
Apr. 4, 2016   (KR) .................. 10-2016-0040885
(Continued)

(51) Int. Cl.
*H04R 1/02* (2006.01)
*H04R 5/02* (2006.01)
(Continued)

(52) U.S. Cl.
CPC .............. *H04R 5/02* (2013.01); *H04N 5/642* (2013.01); *H04R 1/025* (2013.01); *H04R 1/028* (2013.01);
(Continued)

(58) Field of Classification Search
CPC .......... H04R 5/02; H04R 5/642; H04R 1/025; H04R 1/028; H04R 1/288; H04R 3/14; H04R 9/025; H04R 9/06
(Continued)

(56) References Cited

U.S. PATENT DOCUMENTS 4,675,907 A    6/1987  Itagaki et al.
4,891,842 A    1/1990  Green
(Continued)

FOREIGN PATENT DOCUMENTS

CN    1243652 A     2/2000
CN    1547416 A     11/2004
(Continued)

OTHER PUBLICATIONS

Extended European Search Report issued in European Application No. 17183078.9 dated Jan. 16, 2018.
(Continued)

*Primary Examiner* — Disler Paul
(74) *Attorney, Agent, or Firm* — Morgan, Lewis & Bockius LLP

(57) ABSTRACT

Disclosed is a display device that includes a display panel, sound generating actuators including a first sound generating actuator in a first area of the display panel and a second sound generating actuator in a second area of the display panel, the first and second sound generating actuators configured to vibrate the display panel to generate sound, and a partition between the first sound generating actuator and the second sound generating actuator.

23 Claims, 31 Drawing Sheets

(30) Foreign Application Priority Data

| | | |
|---|---|---|
| Apr. 5, 2016 | (KR) | 10-2016-0041384 |
| May 30, 2016 | (KR) | 10-2016-0066455 |
| May 31, 2016 | (KR) | 10-2016-0067431 |
| Jun. 30, 2016 | (KR) | 10-2016-0083122 |
| Nov. 30, 2016 | (KR) | 10-2016-0161789 |
| Nov. 30, 2016 | (KR) | 10-2016-0162189 |
| Dec. 30, 2016 | (KR) | 10-2016-0183867 |

(51) Int. Cl.

| | |
|---|---|
| H04R 9/06 | (2006.01) |
| H04N 5/64 | (2006.01) |
| H04R 1/28 | (2006.01) |
| H04R 11/02 | (2006.01) |
| H04R 9/02 | (2006.01) |
| H04R 3/14 | (2006.01) |
| H04R 1/26 | (2006.01) |
| H04R 7/04 | (2006.01) |

(52) U.S. Cl.
CPC .............. *H04R 1/26* (2013.01); *H04R 1/288* (2013.01); *H04R 3/14* (2013.01); *H04R 7/045* (2013.01); *H04R 9/025* (2013.01); *H04R 9/06* (2013.01); *H04R 9/066* (2013.01); *H04R 11/02* (2013.01); *H04R 5/023* (2013.01); *H04R 2307/023* (2013.01); *H04R 2307/025* (2013.01); *H04R 2400/03* (2013.01); *H04R 2440/05* (2013.01); *H04R 2499/15* (2013.01)

(58) Field of Classification Search
USPC .......................................... 381/333, 306, 87
See application file for complete search history.

(56) References Cited

U.S. PATENT DOCUMENTS

| | | | |
|---|---|---|---|
| 5,025,474 A | 6/1991 | Tanaka et al. | |
| 5,535,028 A | 7/1996 | Bae et al. | |
| 5,796,854 A | 8/1998 | Markow | |
| 5,856,819 A | 1/1999 | Vossler | |
| 6,137,890 A | 10/2000 | Markow | |
| 6,208,237 B1 | 3/2001 | Saiki et al. | |
| 6,238,755 B1 | 5/2001 | Harvey et al. | |
| 6,342,831 B1 | 1/2002 | Azima | |
| 6,443,586 B1 | 9/2002 | Azima et al. | |
| 6,610,237 B2 | 8/2003 | Azima et al. | |
| 6,618,487 B1 | 9/2003 | Azima et al. | |
| 6,677,384 B1 | 1/2004 | Ikemoto et al. | |
| 6,751,329 B2 | 6/2004 | Colloms et al. | |
| 6,792,126 B2 | 9/2004 | Okuno et al. | |
| 6,795,561 B1 | 9/2004 | Bank | |
| 6,819,309 B1 | 11/2004 | Kishi | |
| 6,826,285 B2 | 11/2004 | Azima | |
| 6,871,149 B2 | 3/2005 | Sullivan et al. | |
| 6,911,901 B2 | 6/2005 | Bown | |
| 6,922,642 B2 | 7/2005 | Sullivan | |
| 6,937,124 B1 | 8/2005 | Nakamura et al. | |
| 6,956,957 B1 | 10/2005 | Azima et al. | |
| 6,985,596 B2 | 1/2006 | Bank et al. | |
| 7,020,302 B2 | 3/2006 | Konishi et al. | |
| 7,050,600 B2 | 5/2006 | Saiki et al. | |
| 7,120,264 B2 | 10/2006 | Saiki et al. | |
| 7,157,649 B2 | 1/2007 | Hill | |
| 7,158,651 B2 | 1/2007 | Bachmann et al. | |
| 7,174,025 B2 | 2/2007 | Azima et al. | |
| 7,184,898 B2 | 2/2007 | Sullivan et al. | |
| 7,215,329 B2 | 5/2007 | Yoshikawa et al. | |
| 7,305,248 B2 | 12/2007 | Mori | |
| 7,372,110 B2 | 5/2008 | Hatano | |
| 7,376,523 B2 | 5/2008 | Sullivan et al. | |
| 7,382,890 B2 | 6/2008 | Saiki et al. | |
| 7,536,211 B2 | 5/2009 | Saiki et al. | |
| 7,545,459 B2 | 6/2009 | Fujiwara et al. | |
| 7,564,984 B2 | 7/2009 | Bank et al. | |
| 7,570,771 B2* | 8/2009 | Whitwell | H04R 1/24 |
| | | | 381/152 |
| 7,593,159 B2 | 9/2009 | Yokoyama et al. | |
| 7,657,042 B2 | 2/2010 | Miyata | |
| 7,764,803 B2 | 7/2010 | Kang | |
| 7,769,191 B2 | 8/2010 | Lee et al. | |
| 7,800,702 B2 | 9/2010 | Tsuboi et al. | |
| 7,903,091 B2 | 3/2011 | Lee et al. | |
| 8,174,495 B2 | 5/2012 | Takashima et al. | |
| 8,174,511 B2 | 5/2012 | Takenaka et al. | |
| 8,180,074 B2 | 5/2012 | Ko et al. | |
| 8,194,894 B2 | 6/2012 | Burton et al. | |
| 8,274,480 B2 | 9/2012 | Sullivan | |
| 8,736,558 B2 | 5/2014 | East et al. | |
| 8,830,211 B2 | 9/2014 | Hill | |
| 8,879,766 B1* | 11/2014 | Zhang | H04R 1/028 |
| | | | 381/333 |
| 8,917,168 B2 | 12/2014 | Kono et al. | |
| 8,934,228 B2 | 1/2015 | Franklin et al. | |
| 9,001,060 B2 | 4/2015 | Harris | |
| 9,030,447 B2 | 5/2015 | Hsu | |
| 9,035,918 B2 | 5/2015 | Harris et al. | |
| 9,041,662 B2 | 5/2015 | Harris | |
| 9,046,949 B2 | 6/2015 | Adachi et al. | |
| 9,107,006 B2 | 8/2015 | Wang et al. | |
| 9,122,011 B2 | 9/2015 | Oh et al. | |
| 9,131,301 B2 | 9/2015 | Tsai et al. | |
| 9,137,592 B2 | 9/2015 | Yliaho et al. | |
| 9,148,716 B2 | 9/2015 | Liu et al. | |
| 9,173,014 B2 | 10/2015 | Park | |
| 9,191,749 B2 | 11/2015 | Nabata et al. | |
| 9,197,966 B2 | 11/2015 | Umehara et al. | |
| 9,204,223 B2 | 12/2015 | Nabata et al. | |
| 9,285,882 B2 | 3/2016 | Wang et al. | |
| 9,288,564 B2 | 3/2016 | Faerstain et al. | |
| 9,300,770 B2 | 3/2016 | Nabata et al. | |
| 9,317,063 B2 | 4/2016 | Kwon et al. | |
| 9,332,098 B2 | 5/2016 | Horii | |
| 9,350,832 B2 | 5/2016 | Horii | |
| 9,357,280 B2 | 5/2016 | Mellow et al. | |
| 9,363,591 B2 | 6/2016 | Ozasa et al. | |
| 9,363,607 B2 | 6/2016 | Ando | |
| 9,380,366 B2 | 6/2016 | Kang et al. | |
| 9,389,688 B2 | 7/2016 | Tossavainen et al. | |
| 9,398,358 B2 | 7/2016 | Louh | |
| 9,436,320 B2 | 9/2016 | Kang et al. | |
| 9,544,671 B2 | 1/2017 | Shi et al. | |
| 9,609,438 B2 | 3/2017 | Kim et al. | |
| 9,654,863 B2* | 5/2017 | Crosby | H04R 1/2811 |
| 9,818,805 B2 | 11/2017 | Choi et al. | |
| 2001/0040976 A1 | 11/2001 | Buos | |
| 2001/0043714 A1 | 11/2001 | Asada et al. | |
| 2002/0018574 A1 | 2/2002 | Okuno et al. | |
| 2002/0064290 A1 | 5/2002 | Reynaga et al. | |
| 2002/0141607 A1 | 10/2002 | Azima et al. | |
| 2003/0128503 A1* | 7/2003 | Takahashi | H04N 5/642 |
| | | | 361/679.23 |
| 2003/0233794 A1 | 12/2003 | Pylkki et al. | |
| 2004/0008859 A1 | 1/2004 | Zhao | |
| 2004/0184622 A1 | 9/2004 | Ohashi | |
| 2005/0129258 A1 | 6/2005 | Fincham | |
| 2005/0129265 A1 | 6/2005 | Nakajima et al. | |
| 2006/0018503 A1 | 1/2006 | Endo | |
| 2006/0078138 A1 | 4/2006 | Wada | |
| 2006/0078153 A1 | 4/2006 | Sato | |
| 2006/0120542 A1* | 6/2006 | Lee | H04R 7/045 |
| | | | 381/152 |
| 2006/0126885 A1 | 6/2006 | Combest | |
| 2006/0140439 A1 | 6/2006 | Nakagawa | |
| 2006/0187140 A1 | 8/2006 | Brask | |
| 2007/0019134 A1 | 1/2007 | Park et al. | |
| 2007/0036388 A1 | 2/2007 | Lee et al. | |
| 2007/0187172 A1 | 8/2007 | Kaneda et al. | |
| 2007/0206822 A1 | 9/2007 | Whitwell et al. | |
| 2007/0290609 A1 | 12/2007 | Ishii et al. | |
| 2009/0034174 A1 | 2/2009 | Ko et al. | |
| 2009/0034759 A1 | 2/2009 | Ko et al. | |

(56) References Cited

U.S. PATENT DOCUMENTS

| | | | |
|---|---|---|---|
| 2009/0097692 A1 | 4/2009 | Sakamoto | |
| 2009/0141926 A1 | 6/2009 | Clair et al. | |
| 2009/0247237 A1 | 10/2009 | Mittleman et al. | |
| 2009/0267891 A1 | 10/2009 | Ali | |
| 2010/0320819 A1* | 12/2010 | Cohen | A61H 23/0236 |
| | | | 297/217.4 |
| 2011/0211719 A1* | 9/2011 | Okumura | H04R 1/028 |
| | | | 381/333 |
| 2011/0248935 A1 | 10/2011 | Mellow et al. | |
| 2012/0034541 A1 | 2/2012 | Muraoka et al. | |
| 2012/0242592 A1 | 9/2012 | Rothkopf et al. | |
| 2012/0243719 A1 | 9/2012 | Franklin et al. | |
| 2012/0274570 A1 | 11/2012 | Kim | |
| 2013/0077810 A1 | 3/2013 | Mellow et al. | |
| 2013/0089231 A1 | 4/2013 | Wilk et al. | |
| 2013/0106868 A1 | 5/2013 | Shenoy | |
| 2013/0250169 A1 | 9/2013 | Kim | |
| 2013/0259284 A1 | 10/2013 | Shi et al. | |
| 2013/0279730 A1 | 10/2013 | Tanaka | |
| 2014/0029777 A1 | 1/2014 | Jang | |
| 2014/0049522 A1 | 2/2014 | Mathew et al. | |
| 2014/0145836 A1 | 5/2014 | Tossavainen et al. | |
| 2014/0146093 A1 | 5/2014 | Sako et al. | |
| 2014/0197380 A1 | 7/2014 | Sung et al. | |
| 2014/0241558 A1 | 8/2014 | Yliaho et al. | |
| 2014/0241564 A1 | 8/2014 | Kang et al. | |
| 2014/0326402 A1 | 11/2014 | Lee et al. | |
| 2014/0334078 A1 | 11/2014 | Lee et al. | |
| 2015/0010187 A1 | 1/2015 | Lee et al. | |
| 2015/0016658 A1 | 1/2015 | Lee | |
| 2015/0062101 A1 | 3/2015 | Kim et al. | |
| 2015/0078604 A1 | 3/2015 | Seo et al. | |
| 2015/0119834 A1 | 4/2015 | Locke et al. | |
| 2015/0138157 A1 | 5/2015 | Harris et al. | |
| 2015/0195630 A1 | 7/2015 | Yliaho et al. | |
| 2015/0341714 A1* | 11/2015 | Ahn | G06F 1/1688 |
| | | | 381/333 |
| 2015/0350775 A1 | 12/2015 | Behles et al. | |
| 2016/0011442 A1 | 1/2016 | Lee et al. | |
| 2016/0050472 A1 | 2/2016 | Lee et al. | |
| 2016/0088398 A1 | 3/2016 | Kim et al. | |
| 2016/0165327 A1 | 6/2016 | Crosby et al. | |
| 2016/0212513 A1 | 7/2016 | Honda et al. | |
| 2016/0261966 A1 | 9/2016 | Won | |
| 2016/0345102 A1* | 11/2016 | Tagami | H04R 9/027 |
| 2017/0070811 A1* | 3/2017 | Mihelich | H04R 1/2857 |
| 2017/0280216 A1 | 9/2017 | Lee et al. | |

FOREIGN PATENT DOCUMENTS

| | | |
|---|---|---|
| CN | 1900748 A | 1/2007 |
| CN | 1930910 A | 3/2007 |
| CN | 101093852 A | 12/2007 |
| CN | 202551335 U | 11/2012 |
| CN | 102859998 A | 1/2013 |
| CN | 102946577 A | 2/2013 |
| CN | 103299654 A | 9/2013 |
| CN | 203416417 U | 1/2014 |
| CN | 103594485 A | 2/2014 |
| CN | 203482271 U | 3/2014 |
| CN | 104143292 A | 11/2014 |
| CN | 105096778 A | 11/2015 |
| CN | 105491474 A | 4/2016 |
| CN | 205847596 U | 12/2016 |
| CN | 206807764 U | 12/2017 |
| CN | 107561753 A | 1/2018 |
| CN | 206993387 U | 2/2018 |
| EP | 0916801 A2 | 5/1999 |
| EP | 1 507 438 A2 | 2/2005 |
| EP | 1881731 A1 | 1/2008 |
| EP | 2 036 394 A1 | 3/2009 |
| EP | 2947857 A2 | 11/2015 |
| JP | 55-25284 A | 2/1980 |
| JP | H02-001987 U1 | 1/1990 |
| JP | H03-132296 A | 6/1991 |
| JP | 2696801 B2 | 1/1998 |
| JP | H11-44891 A | 2/1999 |
| JP | 2001-61194 A | 3/2001 |
| JP | 2002-511681 A | 4/2002 |
| JP | 2002-264646 A | 9/2002 |
| JP | 2003-211087 A | 7/2003 |
| JP | 3578244 B2 | 10/2004 |
| JP | 2004-343362 A | 12/2004 |
| JP | 2005-175553 A | 6/2005 |
| JP | 2005-244804 A | 9/2005 |
| JP | 2006-138149 A | 6/2006 |
| JP | 2006-186590 A | 7/2006 |
| JP | 2006279284 A | 10/2006 |
| JP | 2006-319626 A | 11/2006 |
| JP | 2006-325079 A | 11/2006 |
| JP | 3896675 B2 | 3/2007 |
| JP | 2007-267302 A | 10/2007 |
| JP | 2007-528648 A | 10/2007 |
| JP | 2007-300578 A | 11/2007 |
| JP | 2009-100223 A | 5/2009 |
| JP | 2009100223 A | 5/2009 |
| JP | 2009214060 A | 9/2009 |
| JP | 2009-302924 A | 12/2009 |
| JP | 2010-027845 A | 2/2010 |
| JP | 2010-081142 A | 4/2010 |
| JP | 4449605 B2 | 4/2010 |
| JP | 2011-123696 A | 6/2011 |
| JP | 2012-129247 A | 7/2012 |
| JP | 2012-198407 A | 10/2012 |
| JP | 5060443 B2 | 10/2012 |
| JP | 2013-044912 A | 3/2013 |
| JP | 2013-102360 A | 5/2013 |
| JP | 2014-509028 A | 4/2014 |
| JP | 2014-220237 A | 11/2014 |
| JP | 2014-220802 A | 11/2014 |
| JP | 2015-219528 A | 12/2015 |
| KR | 10-2008-0002228 A | 1/2008 |
| KR | 2008-0063698 A | 7/2008 |
| KR | 10-1026987 B1 | 4/2011 |
| KR | 10-1061519 B1 | 9/2011 |
| KR | 10-1404119 B1 | 6/2014 |
| KR | 101410393 B2 | 6/2014 |
| KR | 2015-0005089 A | 1/2015 |
| KR | 10-2015-0031641 A | 3/2015 |
| KR | 10-1499514 B1 | 3/2015 |
| KR | 10-2015-0131428 A | 11/2015 |
| KR | 2015-133918 A | 12/2015 |
| KR | 10-2017-0135673 A | 12/2017 |
| TW | 200706049 A | 2/2007 |
| TW | M451766 U | 4/2013 |
| TW | 201319783 A | 5/2013 |
| TW | 201503710 A | 1/2015 |
| TW | 201545559 A | 12/2015 |
| WO | 99/52322 A1 | 10/1999 |
| WO | 2005/089014 A1 | 9/2005 |
| WO | 2009/017280 A1 | 2/2009 |
| WO | 2012/090031 A1 | 7/2012 |
| WO | 2012/129247 A2 | 9/2012 |
| WO | 2015-046288 A1 | 4/2015 |
| WO | 2016/002230 A1 | 1/2016 |

OTHER PUBLICATIONS

Extended European Search Report issued in European Application No. 17184428.5 dated Jan. 23, 2018.
Extended European Search Report issued in European Application No. 17184429.3 dated Jan. 26, 2018.
Japanese Office Action issued in Japanese Application No. 2016-216426 dated Nov. 24, 2017.
Taiwanese Office Action issued in Taiwanese Application No. 10720014270 dated Jan. 10, 2018.
Taiwanese Office Action issued in Taiwanese Application No. 10621325350 dated Jan. 3, 2018.
Office Action dated May 31, 2017, from the Taiwanese Patent Office in counterpart Application No. 106121605.
Communication dated Jun. 30, 2017 from the European Patent Office in related European application No. 16181195.5.

(56) References Cited

OTHER PUBLICATIONS

Office Action dated Sep. 26, 2017 from the Japanese Patent Office in related Japanese application No. 2016-190615.
Office Action dated Oct. 3, 2017 from the Japanese Patent Office in related Japanese application No. 2016-235794.
Communication dated Sep. 19, 2017 from the European Patent Office in related European application No. 16181185.6.
Communication dated Sep. 5, 2017 from the European Patent Office in related European application No. 16181191.4.
Office Action dated Mar. 27, 2017, from the Korean Patent Office in related Application No. 10-2016-0146951. Note: KR 10-2015-0133918, JP 2009-100223, and JP 2007-300578 cited therein are already of record.
USPTO Office Action dated Sep. 8, 2017 in related U.S. Appl. No. 15/374,566.
USPTO Office Action dated Oct. 26, 2017 in related U.S. Appl. No. 15/471,458.
USPTO Office Action dated Nov. 9, 2017 in related U.S. Appl. No. 15/471,173.
USPTO Office Action dated Aug. 10, 2017 in related U.S. Appl. No. 15/340,709.
USPTO Office Action dated Oct. 13, 2017 in related U.S. Appl. No. 15/471,184.
Hermida, Alfred, "PC Screen Turns Into Speaker," BBC News, Technology, Mar. 31, 2003, pp. 1-2.
Taiwanese Office Action dated May 15, 2018, issued in Taiwanese Application No. 106122586.
Japanese Office Action dated Jul. 3, 2018, issued in Japanese Application No. 2016-235794.
Japanese Office Action dated Jun. 5, 2018, issued in Japanese Application No. 2017-131154.
Shim, Samsung claims double sided LCD, EDN, Jan. 2007.
Japanese Office Action dated Aug. 23, 2018, issued in Japanese Application No. 2017-137757.
Japanese Office Action dated Aug. 23, 2018, issued in Japanese Application No. 2017-124022.
Japanese Office Action dated Sep. 25, 2018, issued in Japanese Application No. 2017-131143.
Final Office Action from the U.S. Patent and Trademark Office issued in U.S Appl. No. 15/987,267 dated Dec. 13, 2018.
Office Action dated Dec. 11, 2018 from the Japanese Patent Office in counterpart Japanese Patent Application No. 2017-131154.
Office Action dated Apr. 9, 2019, from the Japanese Patent Office in counterpart Application No. 2017-124022.
Office Action dated Mar. 20, 2019, from the Chinese Patent Office in counterpart Application No. 201710599021.3. Note: CN 105096778 A cited therein is already of record.
Office Action dated May 7, 2019, from the Chinese Patent Office in counterpart Application No. 201710368161.X. Note: CN 105096778 A cited therein is already of record.
First Notification of Office Action dated Oct. 11, 2019, from the Chinese Patent Office in counterpart Application No. 201710439030.6.
First Notification of Office Action dated Sep. 18, 2019, from the Chinese Patent Office in counterpart Application No. 201710507121.9.
Office Action dated Oct. 24, 2019, from the Taiwanese Patent Office in counterpart Application No. 106121605.
Office Action dated Jun. 4, 2019, from the Chinese Patent Office in counterpart Application No. 201610824741.0.
Office Action dated Jun. 4, 2019, from the Chinese Patent Office in counterpart Application No. 201610827445.6.
Office Action dated Jun. 5, 2019, from the Chinese Patent Office in counterpart Application No. 201610823135.7.
Office Action dated Jul. 5, 2019, from the Chinese Patent Office in counterpart Application No. 201710368140.8.

\* cited by examiner

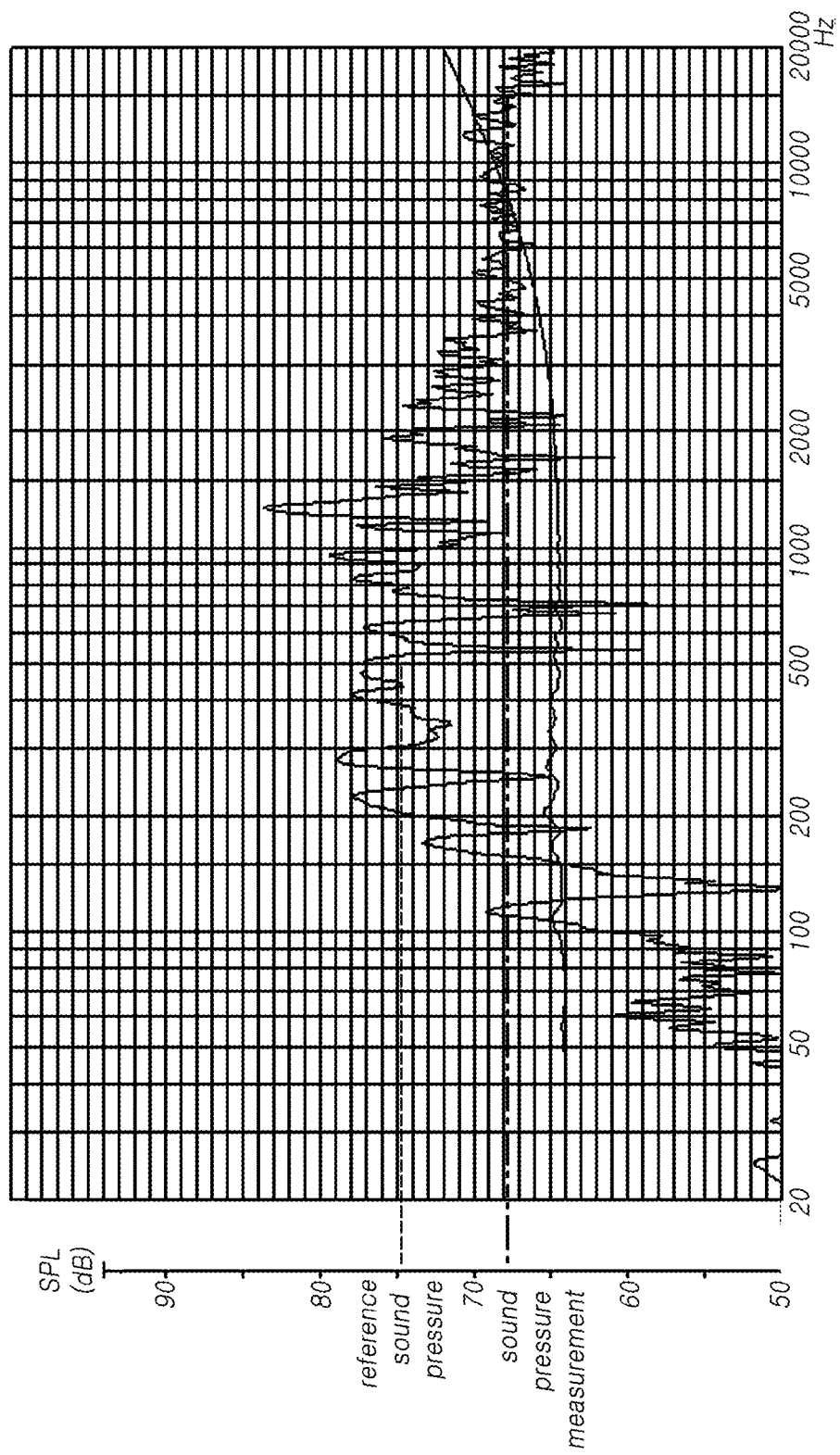

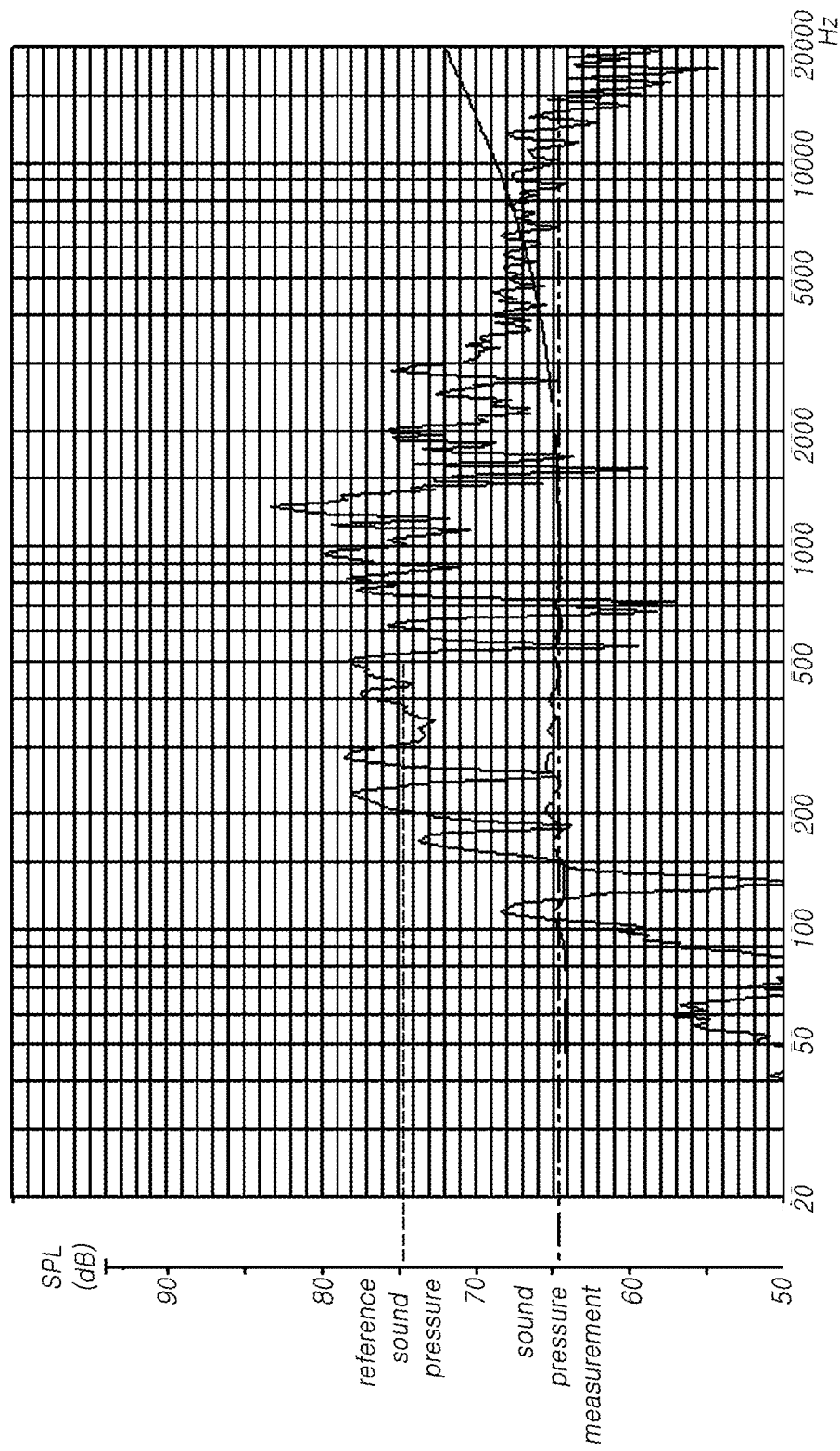

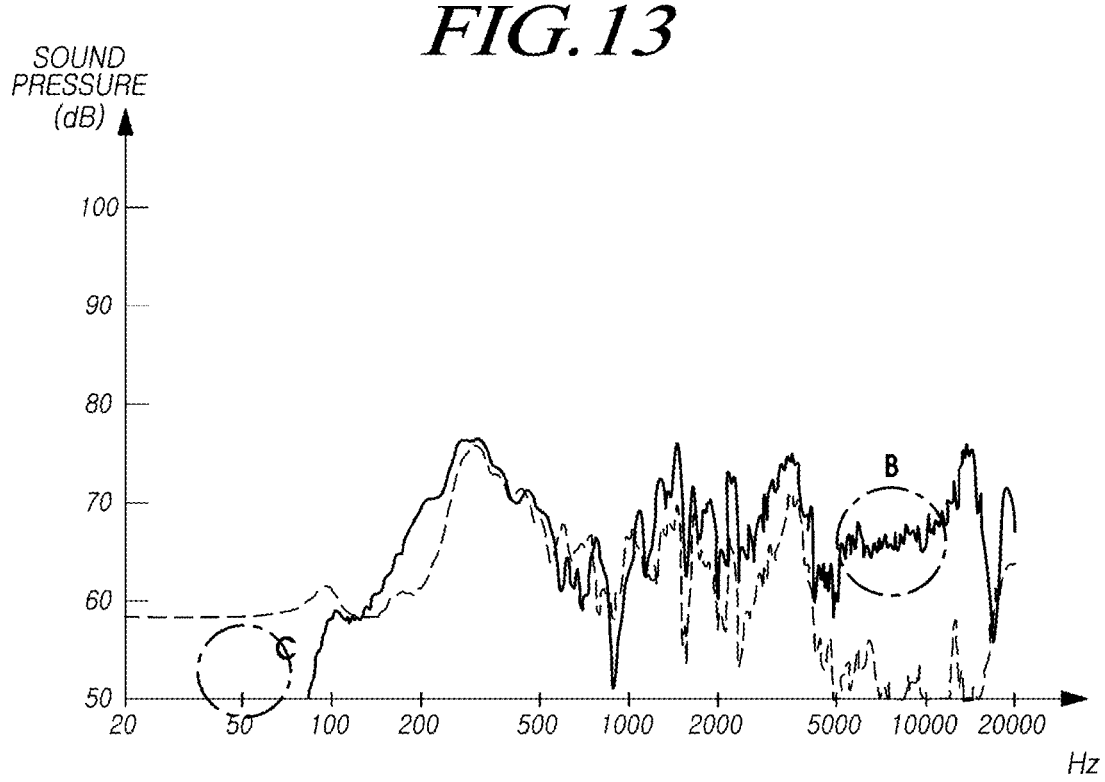

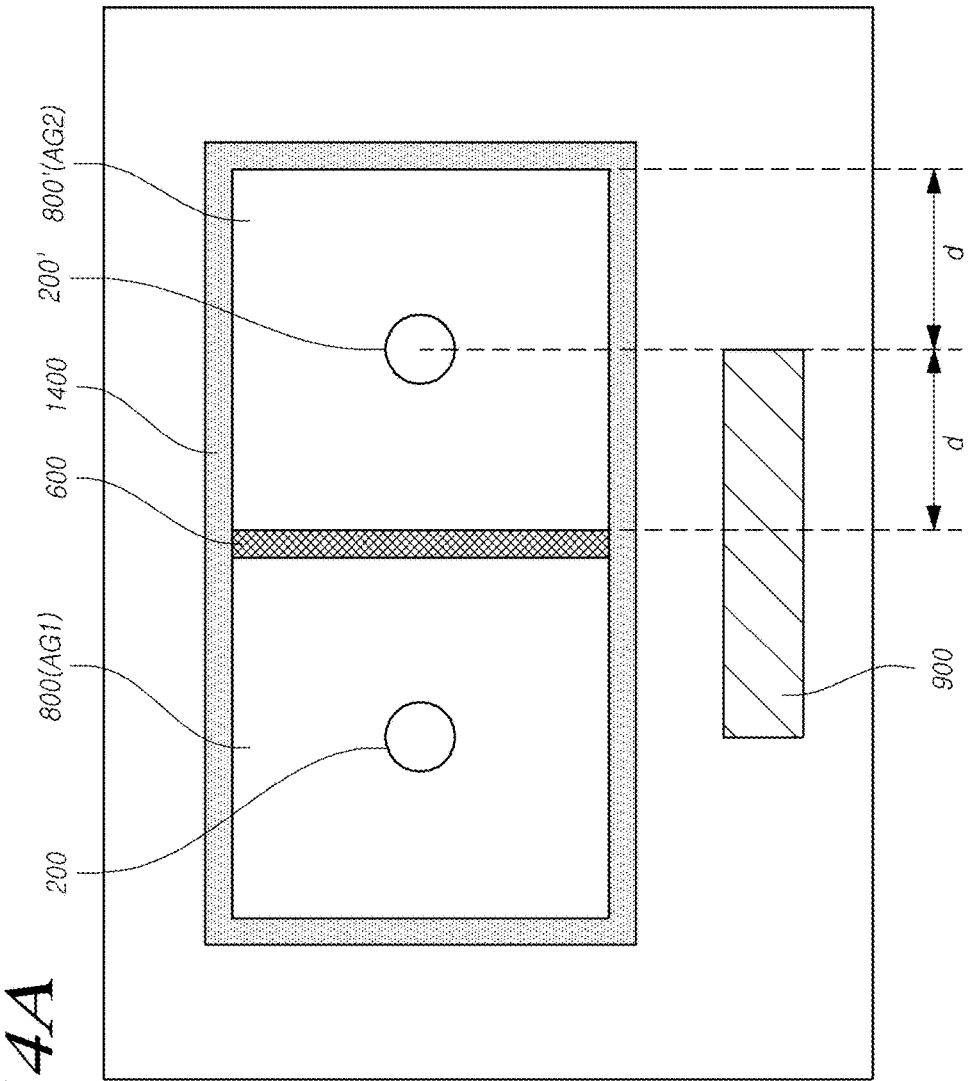

PANEL VIBRATION TYPE SOUND GENERATING DISPLAY DEVICE

CROSS REFERENCE TO RELATED APPLICATIONS

This application is a continuation of U.S. patent application Ser. No. 15/471,458 filed Mar. 28, 2017, which claims the priority of Korean Application No. 10-2016-0037118, filed Mar. 28, 2016, Korean Application No. 10-2016-0040885, filed Apr. 4, 2016, Korean Application No. 10-2016-0041384, filed Apr. 5, 2016, Korean Application No. 10-2016-0066455, filed May 30, 2016, Korean Application No. 10-2016-0067431, filed May 31, 2016, Korean Application No. 10-2016-0083122, filed Jun. 30, 2016, Korean Application No. 10-2016-0161789, filed Nov. 30, 2016, Korean Application No. 10-2016-0162189, filed Nov. 30, 2016, and Korean Application No. 10-2016-0183867, filed Dec. 30, 2016, all of which are hereby incorporated by reference.

BACKGROUND

Technical Field

The present disclosure relates to a display device, and particularly, to a display device that generates sound by vibrating a display panel.

Description of the Related Art

With the development of various portable electronic devices, such as a mobile communication terminal and a notebook computer, a requirement for a display device applicable thereto is increasing. The display devices include an electroluminesent display device, a liquid crystal display device, a light emitting diode display device, and an organic light emitting diode display device.

Among these display devices, the liquid crystal display (LCD) device typically includes an array substrate including an array of thin film transistor, an upper substrate including a color filter layer and/or a black matrix, etc., and a liquid crystal material layer formed therebetween, wherein an alignment state of the liquid crystal is controlled according to an electric field applied between two electrodes of a pixel area, and thereby the transmittance of light is adjusted to display an image.

In a display panel of such a liquid crystal display device, an active area configured to provide an image to a user and a non-active area, which is a peripheral area of the active area, are defined. The display panel is usually manufactured by attaching a first substrate, which is an array substrate having a thin film transistor formed therein to define a pixel area, and a second substrate, which is an upper substrate having a black matrix and/or color filter layer formed thereon, to each other.

The array substrate or first substrate, on which a thin film transistor is formed, includes a plurality of gate lines GS extending in a first direction and a plurality of data lines DL extending in a second direction perpendicular to the first direction, and one pixel area P is defined by each gate line and each data line. One or more thin film transistors are formed in one pixel area P, and gate and source electrodes of each thin film transistor may be connected to a gate line and a data line, respectively.

Among these display devices, the liquid crystal display device does not have its own light-emitting element and thus may need a separate light source. Therefore, the liquid crystal display device may have a back-light unit having a light source, such as an LED, which is arranged at the rear surface thereof and irradiates a light toward a front surface of the liquid crystal panel thereof, thereby implementing a recognizable image.

Meanwhile, an organic light emitting diode (OLED) display device has a fast response rate, a high light emitting efficiency, a high luminance, and a wide viewing angle, due to using an OLED, which self-emits light.

In the organic light emitting diode display device, sub-pixels including organic light emitting diodes are arranged in a matrix form, and the brightness of sub-pixels selected by a scan signal is controlled according to a gray scale of data. Further, the organic light emitting diode display device, which is an emissive element, consumes little power and has a high response speed, a high light emitting efficiency, a high luminance, and a wide viewing angle.

Meanwhile, a set apparatus or finished product including such a display device as described above may include, for example, a television (TV), a computer monitor, or an advertising panel. Such a display device or set apparatus typically includes a sound output device, such as a speaker, for generating and outputting sound relating to output images.

It is typical that a company that manufactures a display device, such as a liquid crystal display device or an organic light emitting diode display device, manufactures only the display panel or display device excluding sound functionality, while another company manufactures a speaker and assembles the speaker with the manufactured display device, so as to complete a set apparatus capable of outputting images and sound.

FIG. 1 is a plan view of a speaker included in a related art display device. As shown in FIG. 1, the related art display device 1 includes a speaker 2 disposed at a rear part or a lower part of the display panel. In this structure, the sound generated by the speaker 2 does not progress directly toward a viewer, who is viewing an image from the front side of the display device 1, but instead progresses toward the rear part or the lower part of the display panel rather than a front part of the display panel on which the images are being displayed.

Further, when the sound generated from the speaker 2 progresses toward the rear part or the lower part of the display panel, the sound quality may be degraded due to an interference with sound reflected by walls, floors, or other surfaces at the rear of or below the display panel.

Also, the sound generated by a speaker included in the related art display device is not oriented toward a viewer of the display device and may thus undergo diffraction, which degrades the sound localization. Moreover, in configuring a set apparatus, such as a TV, a speaker may occupy an undesirably large amount of space, which imposes a restriction on the design and space arrangement of the set apparatus.

Therefore, there has been an increasing requirement for technology which can improve the quality of sound output from a display device and prevent the viewer's immersion from being disturbed.

SUMMARY

Accordingly, embodiments of the present disclosure are directed to a display device that substantially obviates one or more of the problems due to limitations and disadvantages of the related art.

The present disclosure has been made to solve the problems in the related art, and an aspect of the present disclosure is to provide a panel vibration type display device that is capable of generating sound by directly vibrating a display panel constituting the display device Another aspect of the present disclosure is to provide a panel vibration type display device that is capable of implementing excellent stereo sound by including left and right sound generating actuators disposed at predetermined left and right positions in a display panel.

Another aspect of the present disclosure is to provide a display panel that is excellent in implementing left and right stereo sound.

Another aspect of the present disclosure is to provide a display device that is capable of implementing stereo sound while reducing a dip phenomenon that is a sound quality reduction phenomenon in a mid-high sound range.

Another aspect of the present disclosure is to provide a display device that is capable of ensuring a stereo sound characteristic, and the durability and reliability of the sound generating device.

Another aspect of the present disclosure is to provide a display device that is excellent in sound output characteristic in the entire audible frequency band.

Additional features and advantages of the disclosure will be set forth in the description that follows, and in part will be apparent from the description, or may be learned by practice of the disclosure. The objectives and other advantages of the disclosure will be realized and attained by the structure particularly pointed out in the written description and claims hereof as well as the appended drawings.

To achieve these and other aspects of the inventive concepts as embodied and broadly described, a display device may comprise a display panel; sound generating actuators including a first sound generating actuator in a first area of the display panel and a second sound generating actuator in a second area of the display panel, the first and second sound generating actuators configured to vibrate the display panel to generate sound; and a partition between the first sound generating actuator and the second sound generating actuator.

Furthermore, a display device may comprise a display panel; sound generating actuators in a first area of the display panel and a second area of the display panel, the sound generating actuators configured to vibrate the display panel to generate sound, wherein at least one of the first and second areas includes two or more sound generating actuators; and a partition between the first and second areas.

Furthermore, a display device may comprise a display panel; sound generating actuators in a first area of the display panel and a second area of the display panel, the sound generating actuators configured to vibrate the display panel to generate sound; and a speaker outside the first area and the second area.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this specification, illustrate embodiments of the disclosure and together with the description serve to explain the principles of the disclosure. In the drawings:

FIGS. 2A and 2B are schematic views of a display device including a panel vibration type sound generator according to an example embodiment of the present disclosure, in which FIG. 2A is a plan view and FIG. 2B is a cross-sectional view;

FIGS. 8B to 8E illustrate sound generating characteristics according to the position of the left or right sound generating actuator;

FIG. 13 illustrates sound generating characteristics in the case of using the example of FIG. 10;

FIGS. 14A and 14B illustrate a structure further including a low sound speaker disposed outside the first air gap space AG1 and the second air gap space AG2, in addition to the sound generating actuator structure according to an example embodiment.

DETAILED DESCRIPTION

Figure 1:
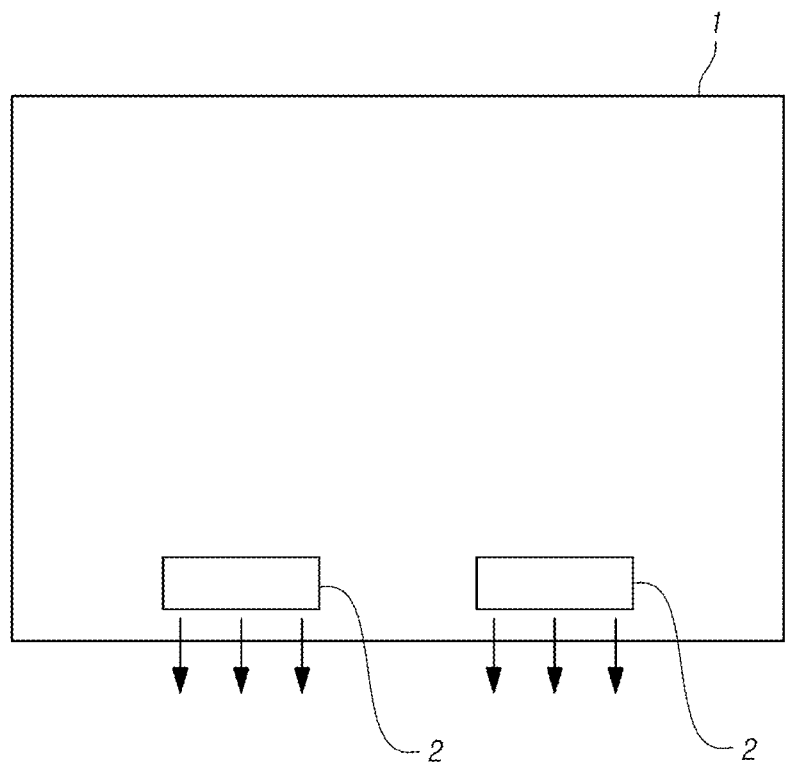
FIG. 1 is a plan view of a speaker included in a related art display device.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed explanation of certain functions and configurations incorporated herein may have been omitted merely for the sake of brevity.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

The term "display device" used herein is used as a concept covering not only a display device in the narrow sense, such as a liquid crystal module (LCM) or an organic light emitting diode (OLED) module that includes a display panel and a driving unit for driving the display panel, but also a set electronic device or a set device or a set apparatus, such as a notebook computer, a TV, a computer monitor, equipment display (e.g., display equipment in an automotive display or other type of vehicle display), or a mobile electronic device (e.g., a smart phone or an electronic pad, etc.) that is a complete product or a final product including the LCM, the OLED module, or the like.

That is, the term "display device" used herein is used in the sense of including not only a display device itself, such as an LCM or an OLED module in the narrow sense, but also includes a so-called "set device" which is an application product or final consumer device having a display device implemented therein.

However, in some cases, an LCM or an OLED module, which is constituted with a display panel, a drive unit of the display panel, and the like, may be referred to as a "display device" in the narrow sense, and an electronic device as a complete product or a final product including an LCM or OLED module may be referred to as a "set device" or a "set apparatus" to be distinguished from the display device. For example, the display device in the narrow sense may include a liquid crystal display (LCD) panel or OLED display panel and a source PCB that is a control unit for driving the display panel, and the term "set device" or "set apparatus" may further include a set PCB that is a set control unit electrically connected to a source PCB so as to control the entire set device or entire set apparatus.

The display panel used in the present embodiments may be any type of display panel, such as an LCD panel, an OLED display panel, etc., without being limited to a specific display panel technology, as long as the display panel is capable of sound waves or audible outputs due to vibrations created by a sound generating actuator (e.g., sound generating actuator 200).

For example, if the display panel is an LCD panel, the display panel may include an array substrate including a plurality of gate lines, a plurality of data lines, a plurality of pixels at or near the intersection areas of the gate lines and the data lines, and thin film transistors as switching elements configured to adjust light transmittance at each pixel, an upper substrate including a color filter layer and/or a black matrix or the like, and a liquid crystal layer formed between the array substrate and the upper substrate.

Also, if the display panel is an OLED display panel, the display panel may include an array substrate including a plurality of gate lines, a plurality of data lines, a plurality of pixels at or near intersection areas of the gate lines and the data lines, and thin film transistors configured to selectively apply voltage or current to each of the pixels, an OLED layer on the array substrate; and a sealed substrate or an encapsulation substrate disposed on the array substrate to cover the OLED layer. The sealed substrate protects the thin film transistors, the OLED layer, and the like from external impact, and prevents moisture/oxygen from penetrating into the OLED layer. The layer on the array sub state may include an inorganic light emitting layer(s), for example, quantum dot layer(s), nano-sized material layer(s), etc., that may enhance output image quality.

With any display type, the display panel may further include a backing, such as a metal plate attached thereto. Other structures may also be included.

The display panel having the actuators described in the specification may be implemented at a user interface module in a vehicle, such as at the central control panel area in an automobile. For example, such a display panel can be configured between two front seat occupants such that sounds due to vibrations of the display panel propagate towards the interior of the vehicle. As such, the audio experience within a vehicle can be improved when compared to having speakers only at the interior sides in the vehicle.

The display panel used in the display device according to the described embodiments is not limited in its shape, size type, etc. An LCD panel includes a number of laminated layers and includes a separate light source, such as a backlight.

On the other hand, an organic light emitting diode of the OLED display panel corresponds to a self-light emitting device, and thus does not require a separate light source, and various layers, such as a polarization layer (POL), a glass layer, and an encapsulation layer, may be laminated as a single panel.

Figure 2A:
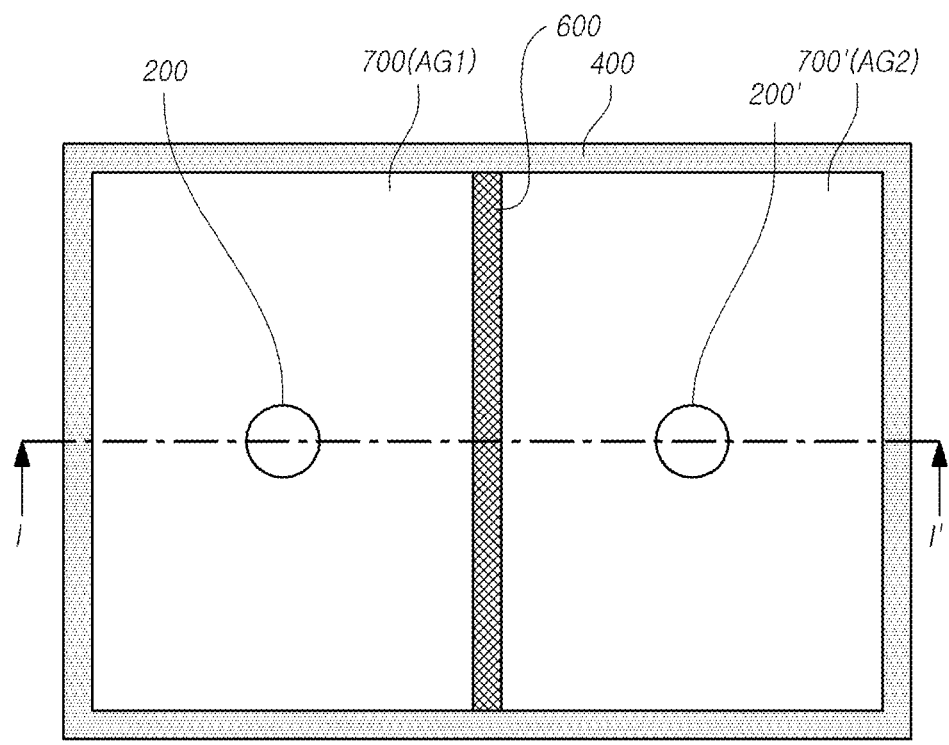
Figure 2B:
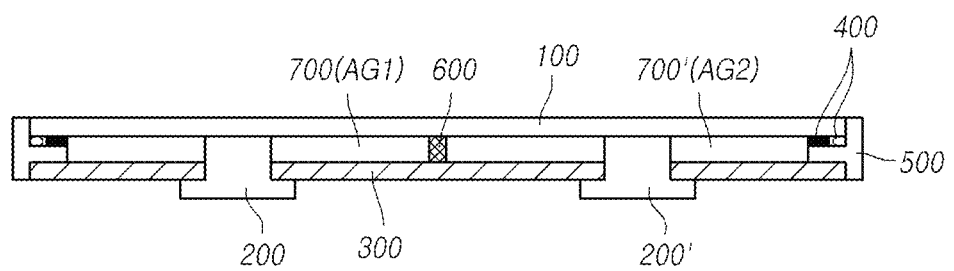

FIGS. 2A and 2B are views of a display device including a panel vibration type sound generator according to an example embodiment. FIG. 2A is a plan view and FIG. 2B is a cross-sectional view of FIG. 2A taken along line I-I'.

As illustrated in FIGS. 2A and 2B, the display device according to an example embodiment includes a display panel 100 configured to display an image, and sound generating actuators 200 and 200' configured to come in contact with one surface of the display panel and vibrate the display panel, thereby generating sound.

The sound generating actuators include a left sound generating actuator 200 disposed in some portion of a left part of the display panel, a right sound generating actuator 200' disposed in some portion of a right part of the display panel, and a sound separation partition portion 600 disposed as a member for separating the left and right sound generating actuators 200 and 200'.

The sound separation partition portion 600 is a partition structure or a partition wall structure extending in the vertical direction or the up and down direction of the display panel (when considered in a normal viewing orientation), and disposed between the display panel 100 and a cover bottom 300 that serves as a rear support portion. The sound separation partition portion 600 may be provided to separate the sound generated from the left sound generating actuator 200 and the sound generated from the right sound generating actuator 200' from each other, in order to prevent the sound characteristics from being deteriorated due to the interference of the two sounds.

The sound separation partition portion 600 may be formed of a foam pad, a one-sided tape, a double-sided tape, or from some other appropriate material, and may be bonded to at least the upper surface of the cover bottom. Also, it may be in contact with the lower surface of the display panel in an adhesive manner or non-adhesive manner.

In order to maintain the low sound emission characteristics together with the sound separation function of the stereo sounds, the sound separation partition portion 600 may be in contact with the lower surface of the display panel in a non-adhesion manner, and the height of the sound separation partition portion 600 may be equal to or larger than the distance between the display panel 100 and the cover bottom 300, e.g., the width of the first or second air gap space 700 or 700'.

The detailed configuration of the example sound separation partition portion 600 will be described in detail below with reference to FIGS. 11A to 11C.

Meanwhile, in order to reduce a dip phenomenon that is a sound pressure reduction phenomenon in a mid-high sound range, the distance d between the sound separation partition portion and the left sound generating actuator or the right sound generating actuator may be adjusted to 200 mm or less, which will be described in more detail below with reference to FIGS. 8A to 8E.

As described in more detail below with reference to FIGS. 4A and 4B and the like, the example left sound generating actuator 200 and the right sound generating actuator 200' each include a magnet, a plate for supporting the magnet, a center pole protruding from a central area of the plate, and a bobbin disposed to surround the periphery of the center pole and wound with a coil to which a current for generating sound is applied. A tip end of the bobbin is disposed to come in contact with one surface of the display panel.

Further, as shown in FIG. 2B, the display device may include a support portion that supports at least one of a rear surface and a side surface of the display panel, and the plate of the sound generating actuator is fixed to the support structure.

Meanwhile, because the left sound generating actuator 200 and the right sound generating actuator 200' may have the same structure, one of the left sound generating actuator 200 and the right sound generating actuator 200' will be representatively referred to as a "sound generating actuator" in the following description.

The rear support portion includes the cover bottom 300 disposed at the rear side of the display panel, and may further include a middle cabinet 500 coupled to the cover bottom while enclosing the side surface of the display panel and accommodating and supporting one side edge of the display panel.

The cover bottom 300 constituting the rear support portion may be a plate-shaped member formed of a metal or plastic that extends over the entire rear side of the display device.

Meanwhile, the cover bottom 300 used herein is not limited by the term, but may be referred to as other terms (e.g., a plate bottom, a back cover, a base frame, a metal frame, a metal chassis, a chassis base, and an m-chassis). The term "cover bottom" shall be understood as a concept including any type of a frame or a plate-shaped structure disposed on the rear base of the display device as a support for supporting the display panel.

Also, the display device according to the example embodiment may further include a baffle portion 400 disposed between the cover bottom 300 as a support portion for the middle cabinet 500 and the display panel so as to form a first air gap space 700 (AG1) and a second air gap space 700' (AG2), which are spaces for transmitting a generated sound wave.

That is, as shown in FIGS. 2A and 2B, the baffle portion 400 is formed as a four-sided sealing structure between the display panel 100 and the cover bottom 300. By the baffle portion 400 and the sound separation partition portion 600, a first air gap space 700 is formed around the sound generating actuator 200, and a second air gap space 700' is formed around the right sound generating actuator 200'.

The first air gap space 700 (AG1) and the second air gap space 700' (AG2) function as a closed space in which sound is generated when the display panel 100 is vibrated by the left sound generating actuator 200 or right sound generating actuator 200'.

In this case, the left sound generating actuator 200 and the right sound generating actuator 200' may be disposed in the first air gap space 700 (AG1) and the second air gap space 700' (AG2), respectively, at positions that are horizontally and/or vertically symmetrical with each other so that stereo sound characteristics and the durability and reliability of the sound generating device can be ensured. Such a configuration will be described in more detail below with reference to FIGS. 9A and 9B.

The baffle portion 400 may include an adhesive member disposed at an edge of the cover bottom 300 or the middle cabinet 500 to be bonded to the lower surface of the display panel, and a sealing portion disposed outside the adhesive member to further provide a sealing property of the first air gap space 700 and a second air gap space 700'.

In this case, the adhesive member may be a double-sided tape. As described in more detail below with reference to FIGS. 7A to 7C, the height of the sealing portion may be larger than the height of the adhesive member.

The detailed structure of such a baffle portion will be described in detail below with reference to FIGS. 7A to 7C.

Figure 3A:
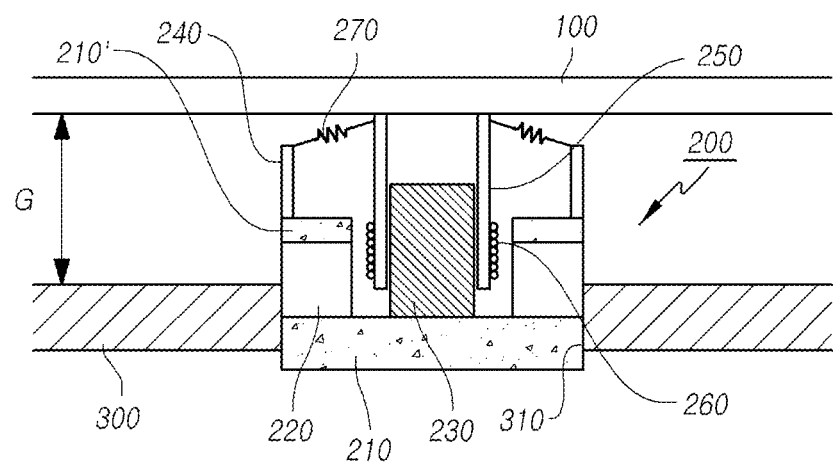
FIGS. 3A and 3B are cross-sectional views of two types of sound generating actuators, each of which may be used as a left or right sound generating actuator of an example embodiment of the present disclosure.
Figure 3B:
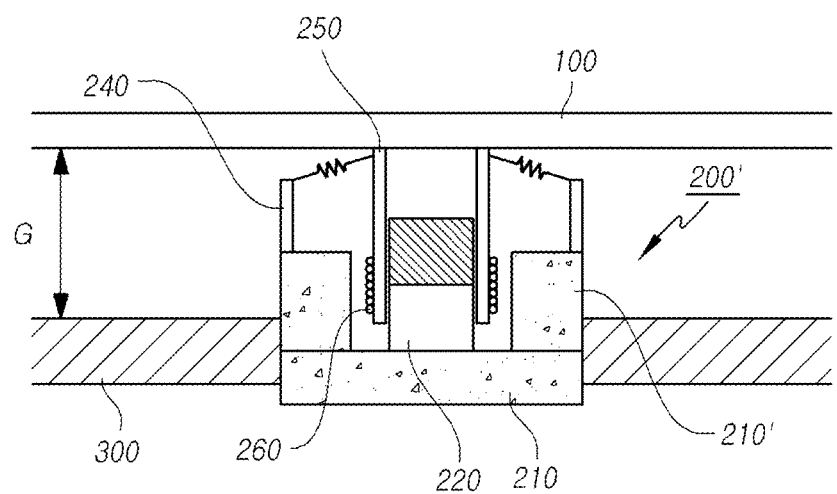

FIGS. 3A and 3B are cross-sectional views of two types of sound generating actuators, each of which may be used as a left or right sound generating actuator of the present disclosure.

The left and right sound generating actuators 200 or 200' used in the example embodiment may each include a magnet 220 as a permanent magnet, plates 210 and 210' configured to support the magnet 220, a center pole 230 protruding from a central area of the plate 210, a bobbin 250 arranged to surround the center pole 230, and a coil 260 wound around the outer periphery of the bobbin 250 and applied with a current for generating sound. However, such detailed structure is merely exemplary, as various other equivalent components can be used to implement the actuators used for the embodiments of the present disclosure.

For example, the sound generating actuator used in the example embodiment may include both of a first structure in which the magnet is disposed outside the coil and a second structure in which the magnet is disposed inside the coil.

The example of FIG. 3A illustrates the first structure in which the magnet is disposed outside the coil, in which the first structure may be referred to as a dynamic type or an external magnet type.

In a sound generating actuator 200 according to the first structure, the lower plate 210 is fixed to a support hole 310 formed in the cover bottom 300, and the magnet 220, which is an annular permanent magnet, is disposed around the outer portion of the lower plate 210.

An upper plate 210' is disposed above the magnet 220, and an outer frame 240 formed to protrude from the upper plate 210' is disposed on the outer periphery of the upper plate 210'.

The center pole 230 protrudes from the central area of the lower plate 210 and the bobbin 250 is disposed to surround the center pole 230.

The coil 260 is wound around the lower portion of the bobbin 250, and a current for generating sound is applied to the coil.

Meanwhile, a damper 270 may be disposed between a part of the upper portion of the bobbin 250 and the outer frame 240.

The lower plate 210 and the upper plate 210' may be configured to fix the sound generating actuator 200 to the cover bottom 300 while supporting the magnet 220. As shown in FIG. 3A, the lower plate 210 is provided in a circular shape, the ring-shaped magnet 220 is provided on the lower plate 210, and the upper plate 210' is provided on the magnet 220.

And, as the lower plate 210 and the upper plate 210' are coupled to the cover bottom 300, the magnet 220 positioned between the lower plate 210 and the upper plate 210' may be fixedly supported.

The plates 210 and 210' may be formed of a magnetic material, such as iron (Fe). The plate is not limited by the term, but may be expressed by other terms, such as a yoke.

Meanwhile, the center pole 230 and the lower plate 210 may be integrally formed.

The bobbin 250 is an annular structure formed of paper, an aluminum sheet, or the like, and the coil 260 is wound around a predetermined lower portion of the bobbin 250. The bobbin 250 and the coil 260 may be collectively referred to as a voice coil.

When a current is applied to the coil 260, a magnetic field is formed around the coil 260, and since there is an external magnetic field formed by the magnet 220, the entire bobbin 250 moves upward while being guided by the center pole 230 according to Fleming's Law.

On the other hand, since the tip end portion of the bobbin 250 is in contact with the rear surface of the display panel 100, the display panel 100 is vibrated according to the current application or non-application state, and a sound wave is generated due to the vibration.

As the magnet 220, a sintered magnet, such as barium ferrite or the like, may be used, and as the material thereof, an alloy casting magnet of ferric oxide ($Fe_2O_3$), barium carbonate ($BaCO_3$), strontium ferrite with an improved magnetic component, aluminum (Al), nickel (Ni), and cobalt (Co), or the like may be used, but embodiments are not limited thereto.

A damper 270 is disposed between a part of the upper portion of the bobbin 250 and the outer frame 240. The damper 270 is provided in a corrugated structure to shrink and relax in accordance with the upward and downward movements of the bobbin 250 so as to adjust the vertical vibration of the bobbin 250. That is, since the damper 270 is connected to each of the bobbin 250 and the outer frame 240, the vertical vibration of the bobbin 250 is limited by the restoring force of the damper 270. In more detail, when the bobbin 250 is vibrated to an upwardly predetermined height or higher or to a downwardly predetermined height or lower, the bobbin 250 can be returned to its original position due to the restoring force of the damper 270. Such a damper 270 may be expressed by any other term, such as an edge.

Meanwhile, FIG. 3B illustrates the second structure in which the magnet is disposed inside the coil, in which the second structure may be referred to as a micro type or an internal magnet type.

In the sound generating actuator 200 according to the second structure, a lower plate 210 is fixed to a support hole 310 formed in a cover bottom 300, a magnet 220 is disposed in the central area of the lower plate 210, and a center pole 230 is formed to protrude above the magnet 220.

An upper plate 210' protrudes from the outer periphery of the lower plate 210, and the outer frame 240 is disposed on the outer portion of the upper plate 210'.

A bobbin 250 is disposed to surround the periphery of the magnet 220 and the center pole 230, and a coil 260 is wound around the outer periphery of the bobbin 250. Also, a damper 270 is disposed between an outer frame 240 and the bobbin 250.

In the second type sound generating actuator 200, fewer leakage magnetic fluxes may be generated and the overall size may be made small as compared to the first type sound generating actuator in which the magnet is disposed on the outside.

In the example embodiment, both the first type sound generating actuator and the second type sound generating actuator can be used, and for the convenience of description, the first type sound generating actuator will be representatively described below.

Also, the sound generating actuator used in the display device according to the example embodiment is not limited to the types illustrated in FIGS. 3A and 3B. A sound generating actuator of any other type may be used as long as the sound generating actuator can vibrate the display panel up and down according to the application of a current to generate sound.

Figure 4A:
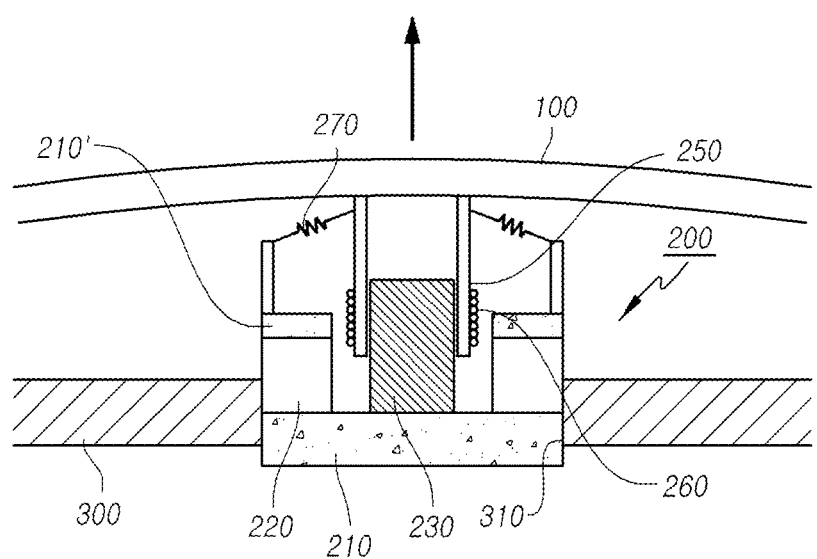
FIGS. 4A and 4B illustrate states in which the left or right sound generating actuator according to an example embodiment of the present disclosure vibrates a display panel to generate sound.
Figure 4B:
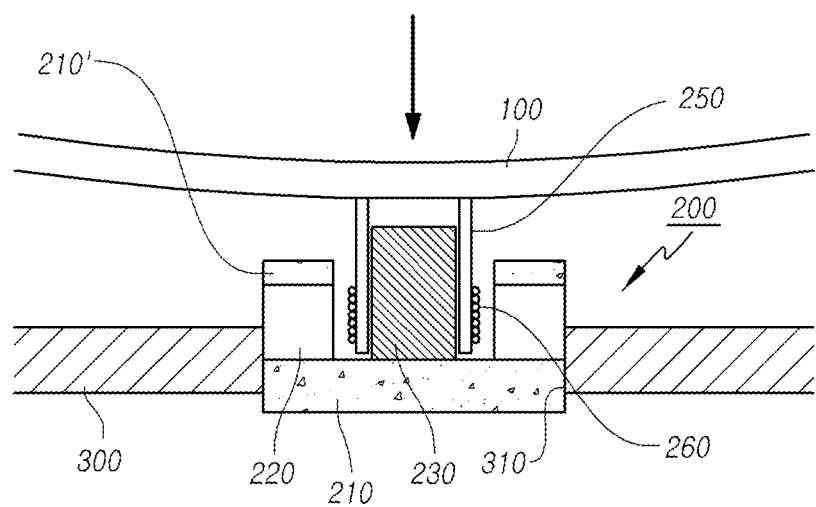

FIGS. 4A and 4B illustrate states in which the left or right sound generating actuator according to an embodiment of the present disclosure vibrates a display panel to generate sound.

With reference to FIG. 4A, in a state in which a current is applied, the center pole 230 connected to the lower surface of the magnet 220 becomes an N pole and the upper plate 210' connected to the upper surface of the magnet 220 becomes the S pole so that an external magnetic field is formed between the coil 260.

In this state, when a current for generating sound is applied to the coil 260, an applied magnetic field is generated around the coil 260, and a force for moving the bobbin 250 upward is generated due to the applied magnetic field and the external magnetic field.

Accordingly, as illustrated in FIG. 4A, the bobbin moves upward (arrow direction) and the display panel 100, which is in contact with the tip end of the bobbin 250, vibrates upward.

In this state, when the application of the current is stopped or a current in the opposite direction is applied, a force for moving the bobbin 250 downward is generated according to a similar principle as illustrated in FIG. 4B, and as a result, the display panel 100 vibrates downward (arrow direction).

In this manner, the display panel vibrates upward and downward according to the current application direction to the coil and the magnitude of the current, and a sound wave is generated by the vibration.

Figure 5A:
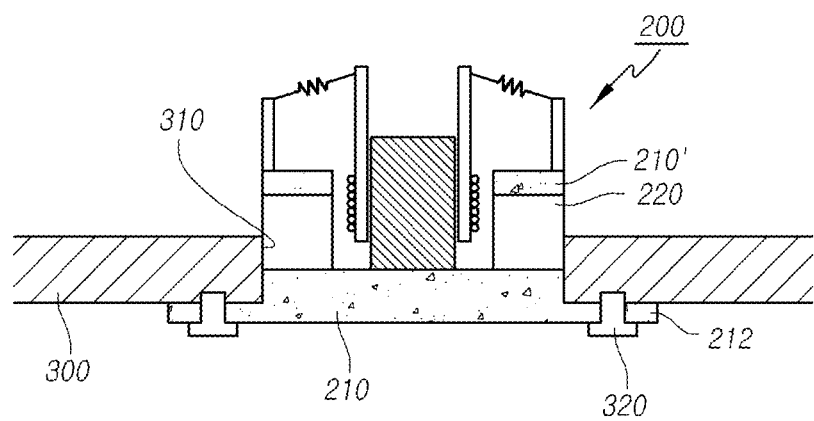
FIGS. 5A and 5B illustrate an example of a coupled state between a left or right sound generating actuator according to an example embodiment of the present disclosure and a cover bottom which is a rear support unit of a display device.
Figure 5B:
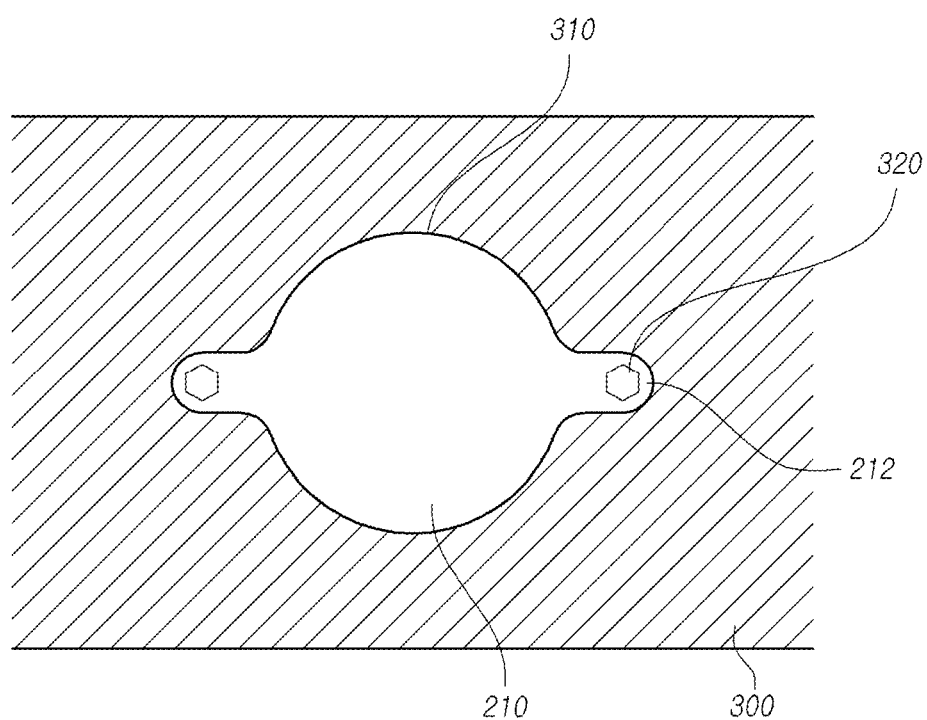

FIGS. 5A and 5B illustrate an example of a coupled state between a left or right sound generating actuator according to an example embodiment of the present disclosure and a cover bottom, which is a rear support unit of a display device.

Figure 6A:
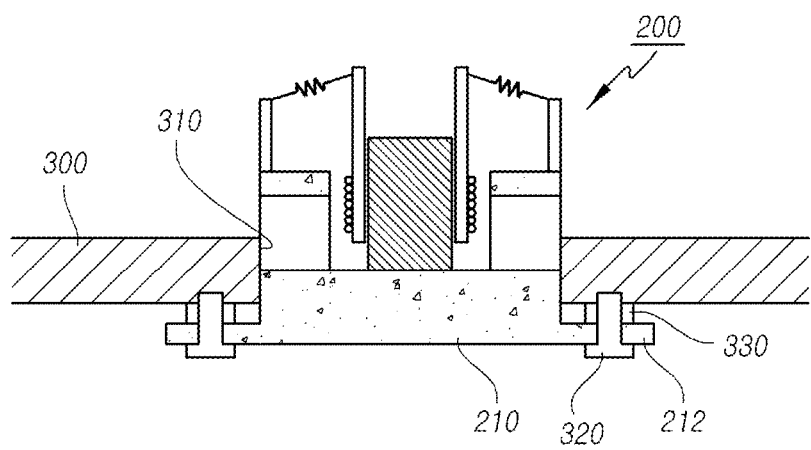
FIGS. 6A and 6B illustrate other example embodiments for the coupling structure between the left or right sound generating actuator and the cover bottom.
Figure 6B:
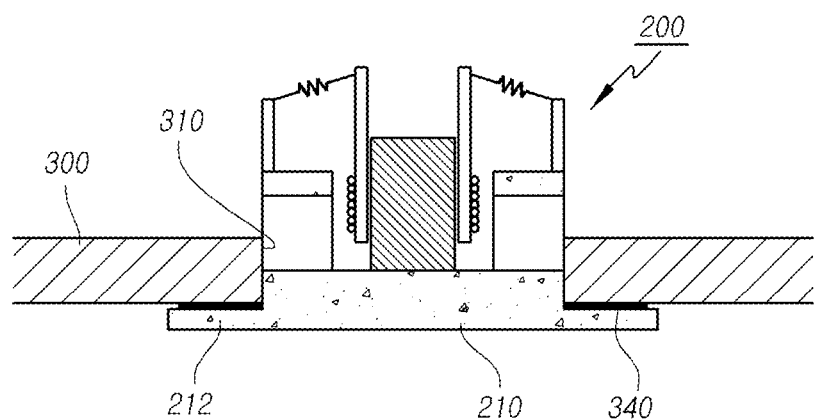

FIGS. 6A and 6B illustrate other embodiments for the coupling structure between a sound generating actuator and a cover bottom.

Hereinafter, one of the left and right sound generating actuators 200 and 200' having the same structure will be representatively described as a sound generating actuator. The same description can be applied to the other sound generating actuator.

The sound generating actuator 200 according to the present embodiment can be supported through a support hole formed in the cover bottom or the back cover which is a support structure of the display device, and FIGS. 5A and 5B and FIGS. 6A and 6B illustrate various support structures.

In the support structure of FIGS. 5A and 5B, a support hole 310 is formed through the cover bottom 300, and at least one of the lower plate 210, the magnet 220, and the upper plate 210' of the sound generating actuator 200 is inserted into and accommodated in the support hole 310.

Extension portions 212 are further formed on the lower surface of the lower plate 210 to extend to the outside of the lower plate 210. The extension portion 212 are fixed to the lower surface of the cover bottom 300 so as to mount the sound generating actuator 200 on the cover bottom 300.

As described above, when the sound generating actuator 200 is fixed to be inserted into the support hole 310 formed in the cover bottom 300, the distance between the display panel 100 and the cover bottom 300 can be reduced, so that the thickness of the display device can be reduced.

That is, between the display panel 100 and the cover bottom 300, a first air gap space or a first space and a second air gap space or a second space, which are the spaces through which the display panel 100 can be vibrated, may be present. In a case where the sound generating actuator 200 is configured to be inserted into and fixed to the support hole 310 of the cover bottom 300, the air gap can be reduced because the height of the sound generating actuator 200 disposed between the rear surface of the display panel 100 and the inner surface of the cover bottom 300 can be reduced.

FIGS. 5A and 5B illustrate the method in which screw holes may be formed in the rear surface of the cover bottom 300 and bolts 320 or screws are fastened through the through holes formed in the extension portion 212 of the lower plate 210, thereby fixing the sound generating actuator 200 to the cover bottom 300.

Meanwhile, FIG. 6A does not illustrate a simple screw coupling type, but a type in which, e.g., PEM® nuts 330 or self-clinching nuts, which can secure a predetermined distance between the cover bottom 300 and the extension portions 212 of the lower plate 210, are disposed and fixed with the bolts 320.

As shown in FIG. 6A, when the PEM® nuts 330 or the self-clinching nuts are used, a predetermined space is secured between the sound generating actuator 200 and the cover bottom 300, so that it is possible to reduce the transmission of the vibration of the actuator 200 to the cover bottom 300.

Also, in FIG. 6B, an adhesive member, such as a double-sided tape, is disposed between the extension portion 212 of the lower plate 210 of the sound generating actuator 200 and the cover bottom 300, thereby fixedly bonding the sound generating actuator 200 and the cover bottom 300 to each other.

When the adhesive member is used as shown in FIG. 6B, the adhesive member may act as a kind of a damper when the elasticity and the thickness of the adhesive member are appropriately adjusted, so that the transmission of the vibration of the actuator to the cover bottom can be reduced.

As illustrated in FIGS. 5 and 6, by adopting a method of fixedly inserting the sound generating actuator 200—which comes in contact with the display panel 100 so as to directly vibrate the display panel 100—into the support hole 310 formed in the cover bottom 300, it may be possible to reduce the thickness of the display device compared to a case where the actuator is completely accommodated in the inside of the display device.

Figure 7A:
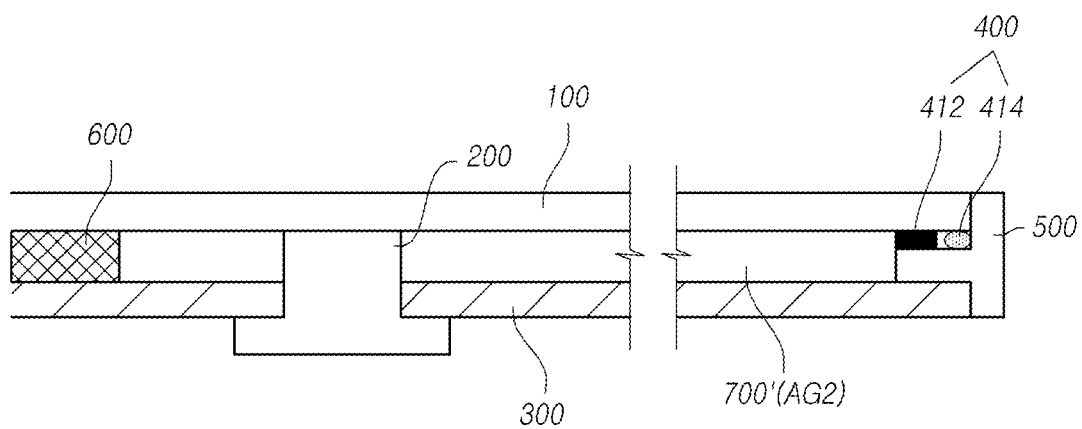
FIGS. 7A to 7C illustrate an example of a baffle portion formed between a display panel and a support structure of the display panel in order to form a first air gap space AG1 and a second air gap space AG2 for sound transmission between the display panel as a vibration plate and a cover bottom.
Figure 7B:
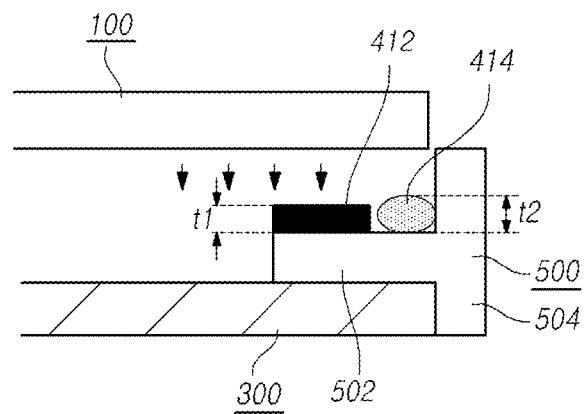

FIGS. 7A and 7B illustrate an example of a baffle portion formed between a display panel and a middle cabinet, which is one of the support structures of the display panel, in order to form a first air gap space 700 and a second air gap space 700' between the display panel as a vibration plate and the cover bottom.

Figure 10:
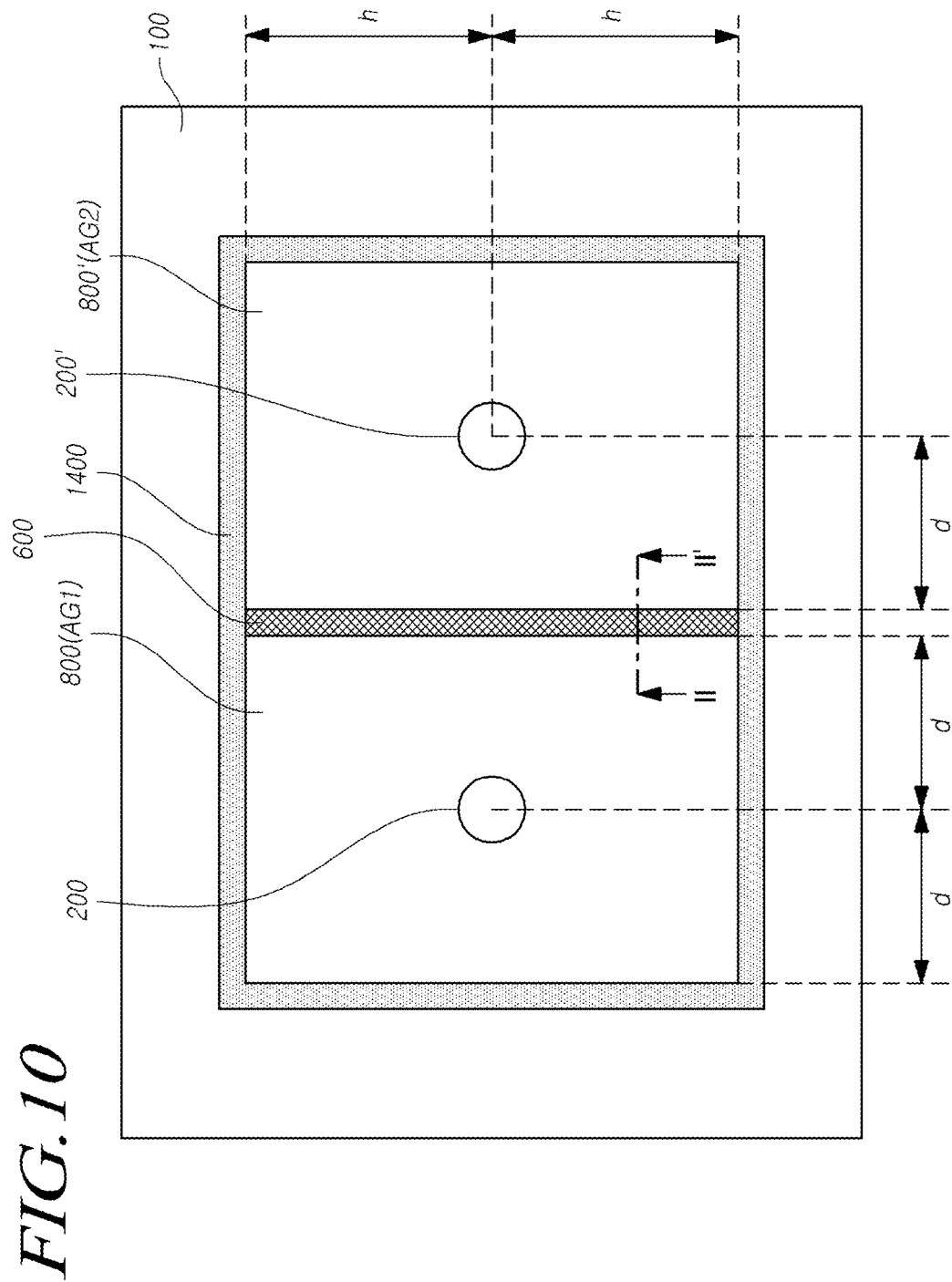
FIG. 10 illustrates an example in which the left and right sound generating actuators according to an example embodiment are arranged horizontally and/or vertically symmetrically in the first air gap space AG1 and the second air gap space AG2.

Of course, the baffle portion to be described below does not necessarily have to be formed between the middle cabinet and the display panel. When the baffle portion is formed inside the outer periphery of the display device as shown in FIG. 10, the baffle portion may be disposed between the display panel and the cover bottom.

As shown in FIG. 7A, in a panel vibration type sound generating device according to the example embodiment, it may be necessary to secure a second air gap space 700', which allows the display panel to be vibrated therein by the right sound generating actuator 200', between the display panel 100 and the support structure (e.g., cover bottom 300).

That is, one side of the display panel 100 may be bonded to the support structure of the display panel 100 so that a sound wave can be generated when the display panel 100 is vibrated, and in an example, the generated sound may not leak to the outside through a side surface or the like of the display device. Thus, for this purpose, the display device according to the example embodiment provides a constant baffle portion 400 between the lower surface of the display panel and the support structure.

For example, a predetermined area (e.g., an air gap space) is defined around the sound generating actuator, and at the edge of the area, the baffle portion is disposed between the lower surface of the display panel and the upper surface of the middle cabinet or the cover bottom.

In this case, the baffle portion 400 includes an adhesive member 412, such as a double-sided tape bonded between the lower surface of the display panel 100 and the upper surface of the support structure of the display device, and a sealing portion 414 is further disposed on the outer periphery of the adhesive member 412.

In this case, the area in which the baffle portion is formed may be the entire display panel area defined by the four peripheral edges of the display panel, but it is not limited thereto. As illustrated in FIG. 10 and the like, the area may be defined as an area having four sides inside the outer periphery of the display panel.

As illustrated in FIGS. 7A and 7B, the support structure of the display device may further include a middle cabinet 500 coupled to the cover bottom 300 and configured to seat a part of the display panel therein, in addition to the cover bottom 300 that covers the entire rear surface of the display panel.

According to the example embodiment, the middle cabinet 500 is a frame-shaped member formed along the periphery of the display panel 100, and includes a horizontal support portion 502 on which a part of the display panel 100 is seated, and a vertical support portion 504 that is bent to the opposite sides to cover a side surface of the cover bottom 300 and a side surface of the display panel 100, so that the middle cabinet 500 may generally have a T-shaped cross section.

The middle cabinet 500 constitutes the side external part of the display device or the set device. In some cases, the middle cabinet 500 may not be used or may be integrally formed with the cover bottom 300.

Figure 7C:
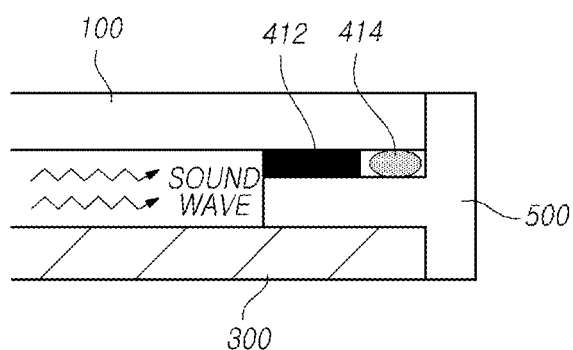

According to the example embodiment of FIGS. 7A to 7C, the adhesive member 412 constituting the baffle portion 400 is a double-sided tape disposed between the upper surface of the horizontal support portion 502 of the middle cabinet 500 and the display panel 100, and serves to fixedly bond the lower surface of the display panel 100 to the middle cabinet 500.

A sealing portion 414 constituting the baffle portion may be further disposed on the outer periphery of the adhesive member 412, and has a thickness or height greater than the thickness or height of the adhesive member 412.

The sealing portion 414 may be formed of a material, such as rubber having high elasticity, and has a thickness t2 that is larger than the thickness t1 of the adhesive member 412, as illustrated in FIG. 7B.

That is, as illustrated in FIG. 7B, one side of the adhesive member 412, which is a double-sided tape having a thickness t1, is bonded to be disposed on the inner portion of the upper surface of the horizontal support portion 502 of the middle cabinet 500, and a sealing portion 414 formed of an elastic material and having a thickness larger than t1 is disposed outside the periphery of the adhesive member 412.

In this state, when the display panel 100 is attached to the other bonding surface of the adhesive member 412, the sealing portion 414 having the larger thickness is pressed to a certain degree, so that the display panel 100 and the middle cabinet 500 are bonded to each other (FIG. 7C). Accordingly, the sealing property of the second air gap space 700' (AG2) around the sound generating actuator 200 can be further improved.

By coupling the display panel 100 and the cover bottom 300 with each other while forming the second air gap space 700' (AG2) by the thickness of the horizontal support portion 502 of the middle cabinet 500 and the adhesive member 412 as illustrated in FIG. 7C, it may be possible to secure a vibration space in which the display panel 100 can generate sound and to prevent the sound waves generated in the vibration space from flowing out to the outside along the side surface of the display device.

Also, by forming the baffle portion 400 disposed at the edge of the air gap space in a double wall structure of the adhesive member 412 and the sealing portion 414, and forming the sealing portion to have a larger thickness, the sealing property of the air gap space can be further improved so that the leakage of sound can be further blocked.

It should be understood that the middle cabinet 500 herein may be expressed by other expressions, such as a guide panel, a plastic chassis, a p-chassis, a support main, a main support, and a mold frame, and is a rectangular frame-shaped structure of a sectional shape having a plurality of bent portions and including all types of members connected to the cover bottom to be used for supporting the display panel and the baffle portion.

The middle cabinet 500 may be formed of a molding material of a synthetic resin, such as polycarbonate, and may be manufactured through an injection molding method, but is not limited thereto.

Meanwhile, although the middle cabinet may be used to support a gap between the cover bottom and the display panel, the middle cabinet may not be a necessary structure.

For example, when the display device has a support structure of only a cover bottom or a back cover without a middle cabinet, or when the first or second air gap space is defined in an inner partial area of the display device as illustrated in FIG. 10, the baffle portion described above with reference to FIGS. 7A to 7C may be disposed between the upper surface of the cover bottom and the lower surface of the display panel.

In this case, the adhesive member 412 in the form of a double-sided tape may be disposed on a part of the upper surface of the cover bottom 300, and the sealing portion 414 having a thickness larger than the thickness of the adhesive member 412 may be disposed outside the adhesive member 412.

In this state, when the display panel 100 is coupled with the cover bottom 300, the sealing portion 414 is squeezed such that the sealing of the second air gap space 700' for sound transmission can be ensured.

With the example embodiment of FIGS. 8A to 8E, an intermediate support structure, such as a middle cabinet, may be omitted to simplify the structure. By forming the baffle portion 400 disposed at the edge of the air gap space to have a double wall structure of the adhesive member 412 and the sealing portion 414 and forming the sealing portion to have a larger thickness, it may be possible to secure a vibration space in which the display panel can generate sound, and to prevent the sound waves generated inside the vibration space from being leaked to the outside along the side surface of the display device.

In the example embodiment, the thickness of the air gap space, that is, the distance T between the display panel and the cover bottom in the air gap space, may be set to about 0.8 to 2.5 mm, but may be adjusted to a different range according to the vibration degree of the display panel without being limited thereto.

Figure 8A:
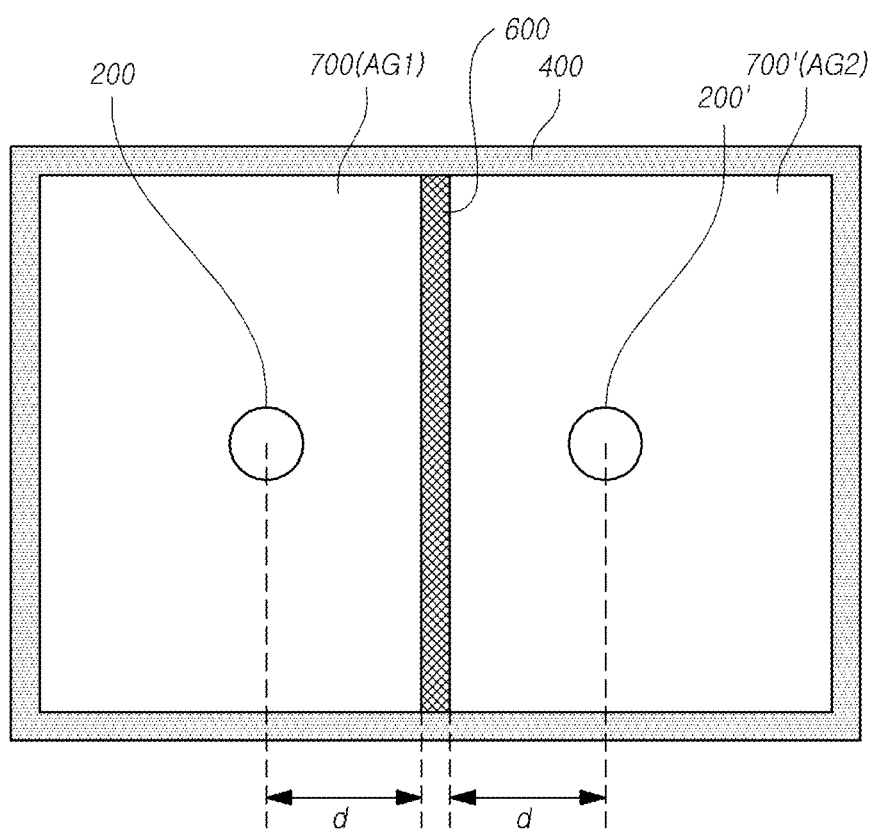
FIG. 8A illustrates a position of the left or right sound generating actuator according to an example embodiment of the present disclosure.

FIG. 8A illustrates a position of the left or right sound generating actuator according to the example embodiment, and FIGS. 8B to 8E illustrate sound generating characteristics according to the position of the left or right sound generating actuator.

In the example embodiment illustrated in FIG. 8A, the left sound generating actuator 200 and the right sound generating actuator 200' are spaced apart from the central sound separation partition portion 600 to left and right by a distance d, respectively.

In this case, the larger the distance d between the left or right sound generating actuator and the sound separating partition portion, the better the stereo sound characteristics.

That is, as the distance d between the left and right sound generating actuators is increased, the left and right separation of the sound generated by the both actuators can be ensured, so that the stereo characteristic can be improved.

However, when the distance d between the two actuators is increased, and when the sound generating current or voltage signals applied to the two actuators in order to implement stereo sound are different from each other, the sound waves generated by the two actuators interfere with each other, so that a phenomenon occurs in which a sound output (sound pressure) may be reduced in a specific frequency band.

For example, it has been confirmed that an abrupt sound pressure reduction phenomenon occurs at a mid-high sound range of 10 kHz or more according to the separation distance d between the left or right sound generating actuator and the sound separation partition portion. The sound pressure reduction phenomenon at a mid-high sound range may be referred to as a dip phenomenon, but is not limited thereto.

As a result of a test, it has been confirmed that, with reference to about 400 mm regardless of the left and right length of the display panel, when the distance 2d between the left and right sound generating actuators (e.g., the distance d between the sound separation partition portion and the two actuators is about 200 mm) is increased over 400 mm as the two actuators are spaced farther away from each other, the dip phenomenon becomes severe to such an extent that the dip phenomenon cannot be corrected, which will be described in more detail below.

FIGS. 8B to 8E illustrate test results obtained by measuring a sound output amount (sound pressure) in each frequency band based on the output of 1 watt (W) at a position 1 m ahead for each case where the distance d between each of the left and right sound generating actuators and the central sound separation partition portion is 70 mm, 150 mm, 200 mm, and 250 mm, respectively.

As a method for measuring a sound pressure in a specific frequency band, it is possible to define a sound pressure level (SPL) typically at about 200 Hz to 500 Hz as a reference sound pressure, and then to determine whether a sound pressure measured in a specific frequency band is different from the reference sound pressure.

In the test represented in FIGS. 8B to 8E, the above-described method was also used in order to measure a sound pressure at each frequency band of the sound generating device according to the example embodiment. The reference sound pressure, which is an average sound pressure at about 200 Hz to 500 Hz, was measured to be about 74 dB to 75 dB, and based on this, it was measured how much the average sound pressure at a mid-high sound range, especially at 15 kHz, is reduced from the reference sound pressure. In FIGS. 8B to 8E, each solid line represents an actually measured sound pressure and each dotted line represent an average value (intermediate value). Because the high sound range that is audible by an ordinary human is 15 kHz or less, an average sound pressure at 15 kHz was measured at the test represented in FIGS. 8B to 8E.

In general, when the average output sound pressure at a specific frequency band is within ±10 dB of the reference sound pressure, it may be corrected by a software-based amplifier tuning like an equalizer. However, when the average output sound pressure exceeds ±10 dB compared to the reference sound pressure, the sound output characteristic gets worse because it may be difficult or impossible to correct the average output sound pressure.

As illustrated in FIG. 8B, when the distance d between each of the left and right sound generating actuators 200 and 200' and the central sound separation partition portion 600 is 70 mm, it can be seen that the average output sound pressure at 15 kHz, which is the highest in the audible frequency band, is about 68 dB, which is within the range of 10 dB or less than about 74 dB to 75 dB, and thus is within the correctable or calibratable range.

Figure 8C:
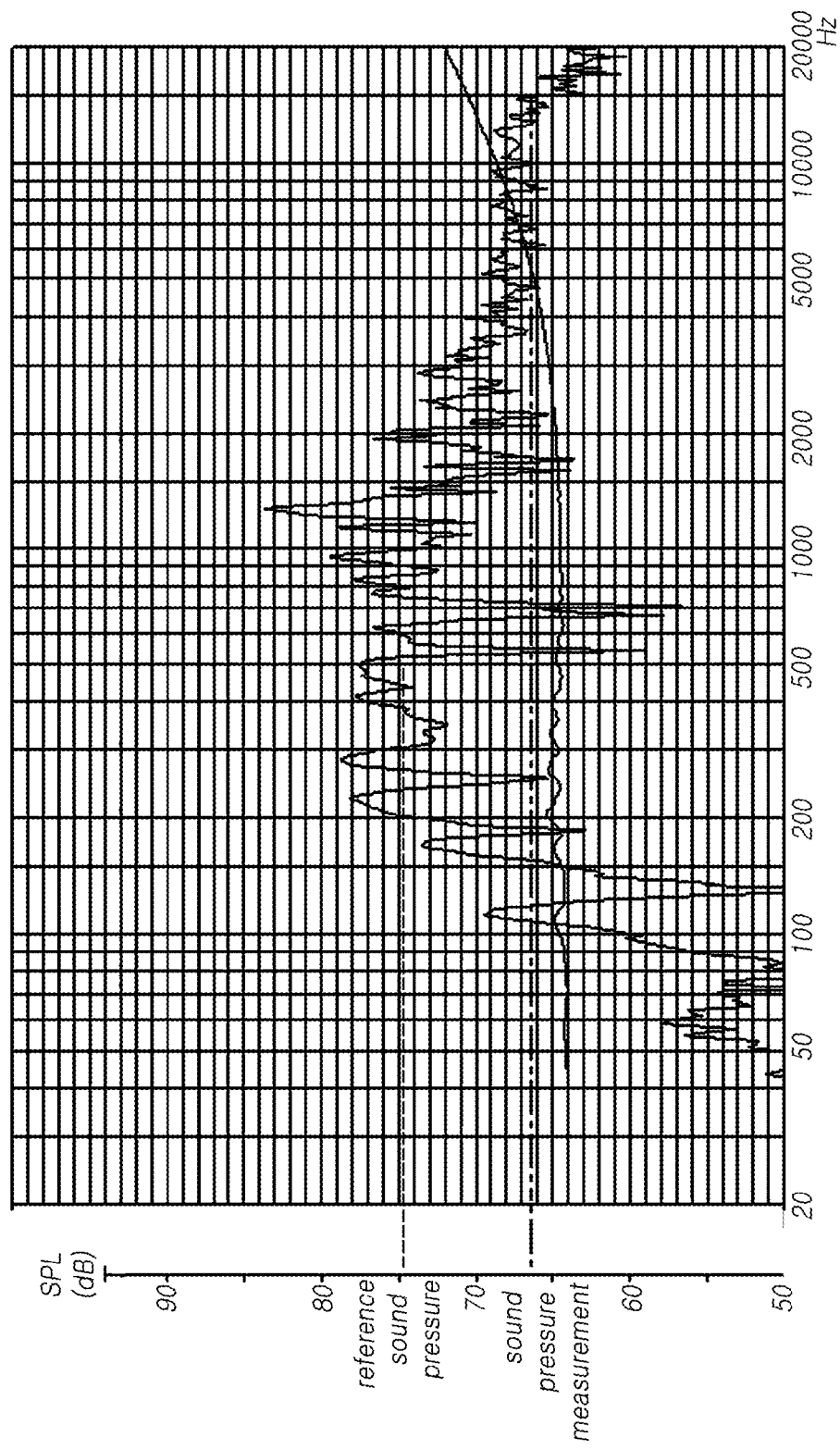

Similarly, as illustrated in FIGS. 8C and 8D, even when the distance d between each of the actuators 200 and 200' and the central sound separation partition portion 600 is 150 mm or 200 mm, it can be seen that the average output sound pressure at 15 kHz is about 66 dB or about 64 dB, which is within a range of about 10 dB or less than about 74 dB to 75 dB (which is the reference sound pressure), and thus is within the correctable or calibratable range.

Figure 8E:
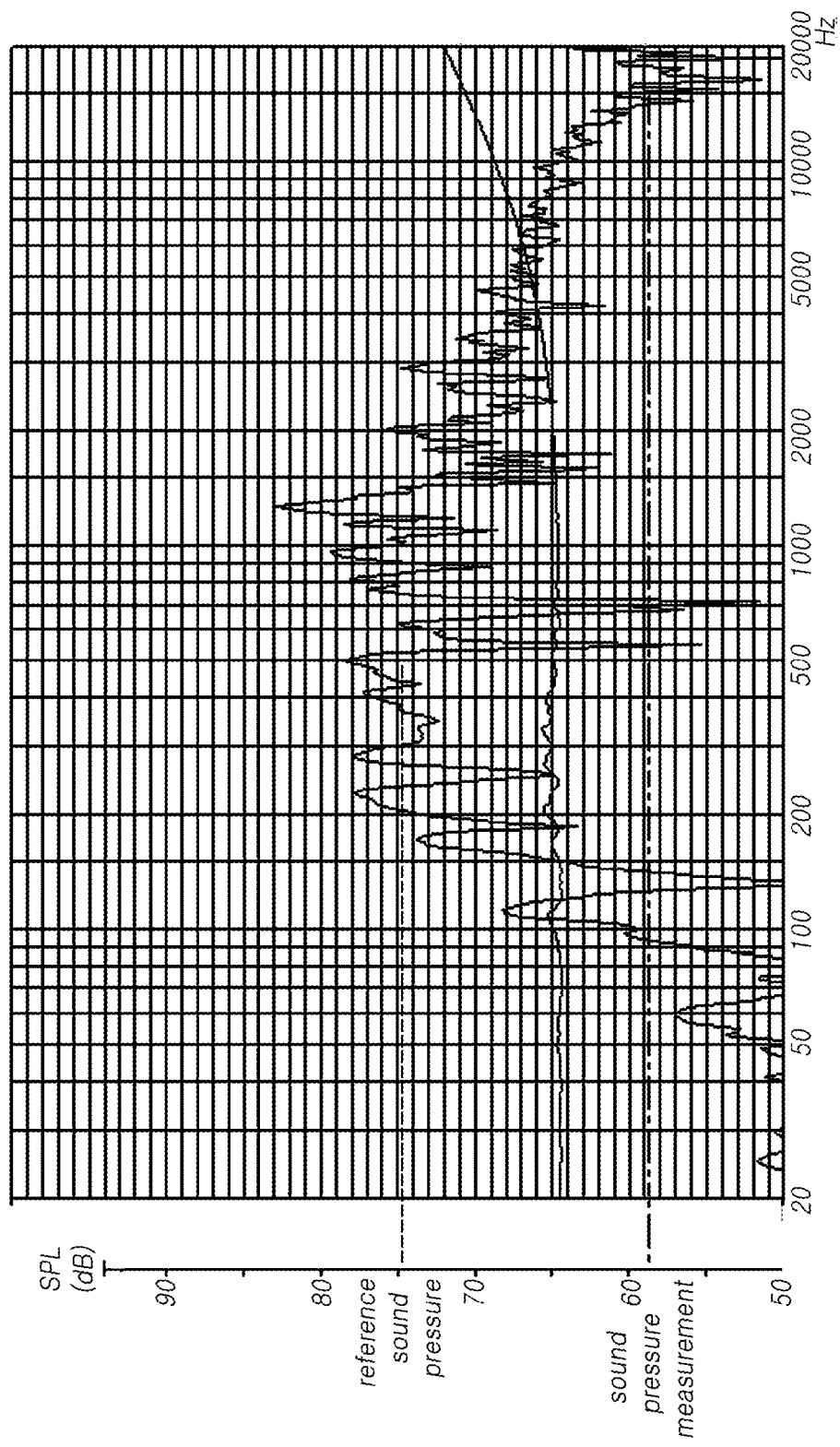

On the other hand, as illustrated in FIG. 8E, when the distance d between each of the actuators 200 and 200' and the central sound separation partition portion 600 is 250 mm, it can be seen that the average output sound pressure at 15 kHz becomes about 60 dB or less, and is lower than the reference sound pressure by 10 dB or more, which may be a non-correctable state or a non-calibratable state.

For example, with reference to a case where the distance d between each of the actuators 200 and 200' and the central sound separation partition portion 600 is 200 mm, when the separation distance d is 200 mm or more, a phenomenon occurred in which the average output sound pressure at 15 kHz was reduced by 10 dB or more compared to the reference sound pressure.

Therefore, in the example embodiment, in order to maintain the sound pressure reduction phenomenon in the mid-high sound range within a correctable extent, the distance d between the left sound generating actuator 200 or the right sound generating actuator 200' and the sound separation partition portion 600 may be adjusted to 200 mm or less.

Meanwhile, as the distance between the two sound generating actuators becomes closer to each other, a stereo sound characteristic obtained by the left and right sound separation may be deteriorated. Therefore, in order to maintain the stereo sound characteristic above a predetermined level, the distance 2d between the two sound generating actuators may be adjusted to about 200 mm or more.

As a result, in the example embodiment, by adjusting the distance d between the left sound generating actuator 200 or the right sound generating actuator 200' and the sound separation partition portion 600 to about 100 mm or more and about 200 mm or less, it may be possible to maintain the dip phenomenon, which is the sound pressure reduction phenomenon in the mid-high sound range, within a correctable level while maintaining the stereo sound characteristic at a predetermined or higher level.

Figure 9A:
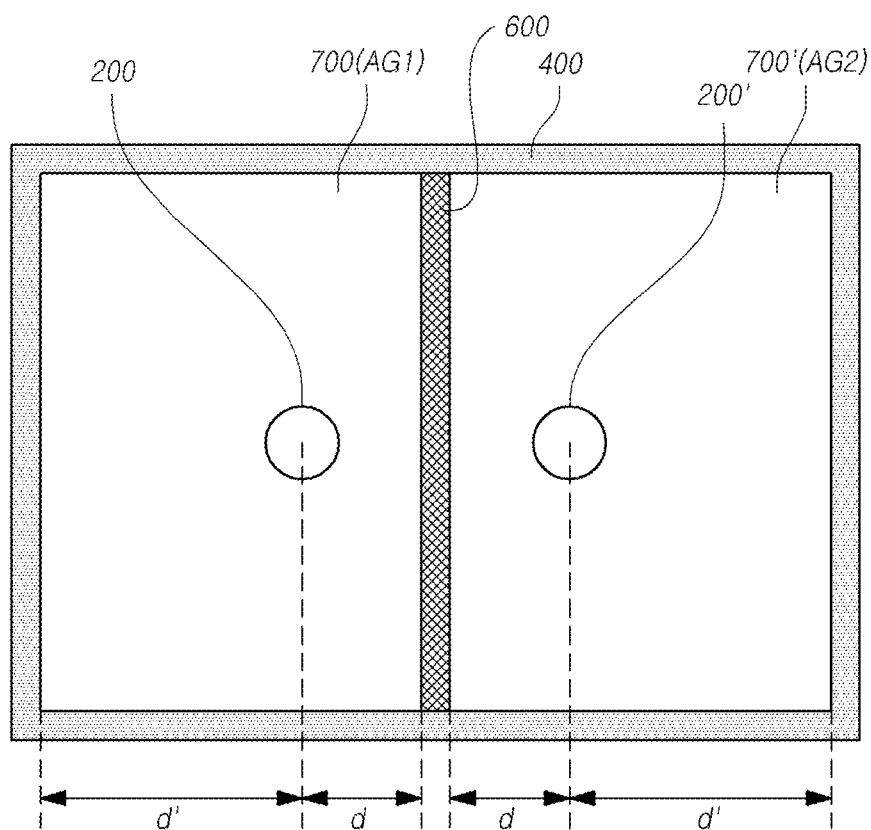
FIGS. 9A and 9B illustrate an example in which the left and right sound generating actuators are arranged asymmetrically in a first air gap space AG1 and a second air gap space AG2.
Figure 9B:
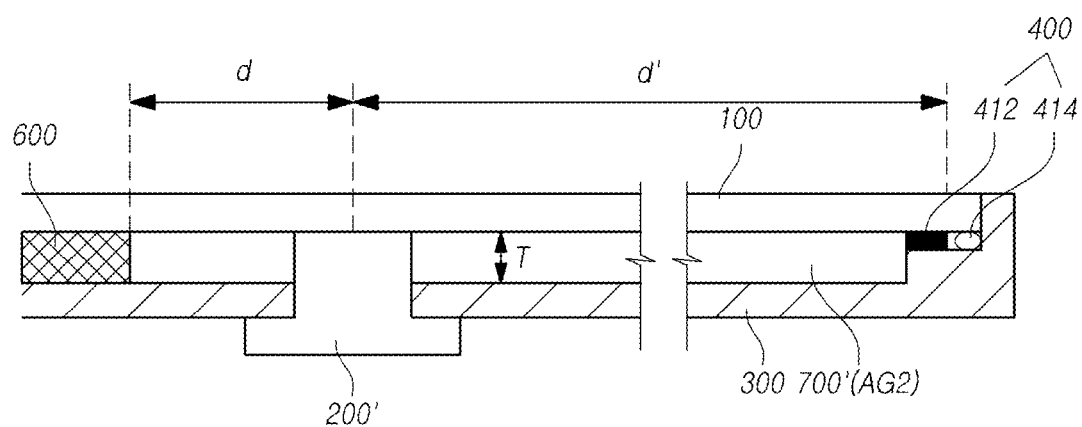

FIGS. 9A and 9B illustrate an example in which the left and right sound generating actuators are arranged asymmetrically in a first air gap space AG1 and a second air gap space AG2.

As described above with reference to FIGS. 8A to 8E, when the distance 2d between the two sound generating actuators is set to about 400 mm or less in order to reduce the dip phenomenon in a mid-high sound range, the positions of the left sound generating actuator 200 and the right sound generating actuator 200' in the first air gap space AG1 and the second air gap space AG2 may be determined asymmetrically according to the left and right length (i.e., the horizontal length) of the display panel.

For example, when the left and right length (e.g., the horizontal length) of the display panel is 800 mm or less, the distance d between the sound separation partition portion 600 and the left or right sound generating actuators 200 and 200' may be properly adjusted in a range of 200 mm or less, the left sound generating actuator 200 and the right sound generating actuator 200' may be disposed at the centers, in reference to the left and right direction, within the first air gap space AG1 and the second air gap space AG2, respectively.

However, in recent years, the sizes of display panels have been enlarged so that the display panels often have the left and right length (e.g., the horizontal length) of 1000 mm or more. In this case, when the distance d between the left sound generating actuator 200 or the right sound generating actuator 200' and the sound separation partition portion 600 is set to about 200 mm or less, it may be inevitable that the distance d between each of the sound generating actuators and the sound separation partition portion and the distance d' between each of the sound generating actuators and the vertical sides of both sides of the baffle portion have different values.

That is, the left sound generating actuator 200 is disposed at a position biased to the right side rather than at the horizontal central position in the first air gap space 700. Similarly, the right sound generating actuator 200' is disposed at a position shifted to the left side, rather than at the horizontal central position in the second air gap space 700'.

When the left sound generating actuator 200 and the right sound generating actuator 200' are disposed at the horizontally non-central positions in the first air gap space AG1 and the second air gap space AG2, respectively, unbalanced vibration of the display panel may be generated within each of the air gap spaces so that the sound characteristic may be deteriorated, and the durability or reliability of the display device may also be deteriorated.

That is, when each of the actuators is disposed at one side in each air gap space, unbalanced vibration may be generated, in which the unbalanced vibration uses a point shifted to one side as the vibration center, rather than using the center of the display panel area included in each air gap space as the vibration center.

According to such unbalanced vibration, the vibration amount varies from position to position in the display panel area included in the air gap space, so that the sound output characteristic may be deteriorated. Further, when the unbalanced vibration is continued for a long time, the durability or reliability of the display panel may be deteriorated.

FIG. 10 illustrates an example in which the left and right sound generating actuators according to the example embodiment are arranged horizontally and/or vertically symmetrically in the first air gap space AG1 and the second air gap space AG2.

In order to solve the drawbacks described with reference to FIGS. 9A and 9B, in the example embodiment illustrated in FIG. 10, the baffle portion 1400 may be disposed inside the outer periphery of the display panel 100 such that the left and right sound generating actuators 200 and 200' may be disposed at horizontally (left and right) and/or vertically (up and down) symmetrical positions in the first air gap space 800 and the second air gap space 800'.

In more detail, in order to form the sealed first and second air gap spaces 800 (AG1) and 800' (AG2) around the left sound generating actuator 200 and the right sound generating actuator 200' together with the sound separation partition portion 600 described above, the baffle portion 1400 is disposed to surround the left sound generating actuator 200 or the right sound generating actuator 200' such that the left sound generating actuator 200 is disposed at the center of the left and right (horizontal) length as well as the vertical (up and down) length of the first air gap space 800 (AG1), while the right sound generating actuator 200' is disposed at the center of the left and right length as well as the vertical length of the second air gap space 800' (AG2).

That is, as illustrated in FIG. 10, the left sound generating actuator 200 is disposed such that the left and right (horizontal) distances d of the left sound generating actuator 200 from the left vertical side of the baffle portion 1400 and the sound separation partition portion 600 are equal to each other, and the vertical (up and down) distances h of the left sound generating actuator 200 from the upper side of the baffle portion 1400 and the lower side are equal to each other.

For this purpose, the baffle portion 1400 may be formed inside the outer periphery of the display panel 100, unlike the baffle portion 1400 that is formed along the outer periphery of the display panel 100 as illustrated in FIGS. 2A and 2B or the like.

As was illustrated in FIGS. 7A to 7C, the baffle portion 1400 in this case may have a double wall structure that includes an adhesive member 412 bonded to the upper surface of the cover bottom 300 and the lower surface of the display panel 100, and a sealing portion 414 disposed outside the adhesive member 412, but may be configured only by an adhesive member without being limited thereto.

In this way, by adjusting the positions of the baffle portion 1400 and the sound separation partition portion 600 such that the left and right sound generating actuators 200 and 200' can be disposed at the central positions of the first air gap space 800 and the second air gap space 800', it may be possible not only to improve stereo sound implementation characteristics, but also to prevent unbalanced vibration to improve the durability of the display device and the reliability of the sound output.

Figure 11A:
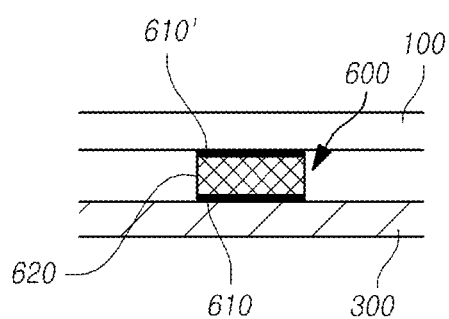
FIGS. 11A to 11C illustrate a detailed configuration of a sound separation partition portion according to an example embodiment.
Figure 11B:
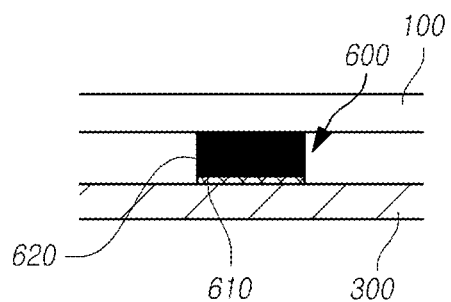
Figure 11C:
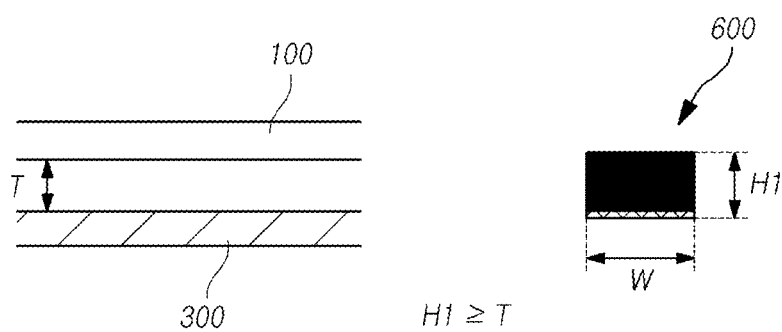

FIGS. 11A to 11C are cross-sectional views taken along line II-II' in FIG. 10, each illustrating a detailed configuration of the sound separation partition portion according to the example embodiment.

As illustrated in FIGS. 11A to 11C, the sound separation partition portion 600 of the example embodiment extends in the vertical direction in the central area of the display panel in order to function to separate left sound and right sounds which are respectively generated by the left and right sound generating actuators.

That is, the sound separation partition portion 600 functions to block the sound of each air gap space from being transmitted to the other air gap space by attenuating or absorbing the vibration of the display panel 100 in the first air gap space and the second air gap space in the central area therebetween.

The sound separation partition portion 600 may be constituted with a double-sided tape or a single-sided tape formed of polyurethane (PU) or polyolefin (PO) having a predetermined height (thickness) and width, and may have elasticity to be compressible to a certain extent. The sound separation partition portion 600 may be expressed by other terms, such as a foam pad.

The sound separation partition portion 600 is disposed between the upper surface of the cover bottom 300 and the lower surface of the display panel 100, and is fixedly bonded to at least the upper surface of the cover bottom 300.

Meanwhile, the upper end surface of the sound separation partition portion 600 may be in contact with the lower surface of the display panel 100, but it may be fixedly bonded to the lower surface of the display panel 100 or may be in contact with the lower surface of the display panel 100 without being bonded or adhered thereto.

That is, in the example embodiment of FIG. 11A, the sound separation partition portion 600 may include a lower adhesive layer 610 bonded to the upper surface of the cover bottom 300, an upper adhesive layer 610' bonded to the lower surface of the display panel 100, and a partition layer 620 disposed between the two adhesive layers 610 and 610'. The sound separating partition portion 600 may be fixedly bonded to both the upper surface of the cover bottom 300 and the lower surface of the display panel 100.

If the sound separation partition portion 600 is bonded to both the cover bottom 300 and the display panel 100 as illustrated in FIG. 11A, the vibration of both air gap spaces is substantially absorbed so that the vibration of one air gap space is not transmitted to the other air gap space, which is advantageous in that the left and right sound separation characteristic may be excellent.

However, in the structure of FIG. 11A, because the vibrations of the first air gap space and the second air gap space are completely separated from each other, the size of a vibration plate may be reduced so that the sound pressure in a low sound range can be reduced.

The sound separation partition portion 600 according to the example embodiment of FIG. 11B includes only the lower adhesive layer 610 bonded to the upper surface of the cover bottom 300 and the partition layer 620 disposed above the lower adhesive layer so that the sound separation partition portion 600 may be bonded only to the upper surface of the cover bottom 300 and may be in contact with the bottom surface of the display panel 100 in a non-adhesion manner.

That is, the upper end surface of the partition layer 620 of the sound separation partition portion 600 is in contact with the lower surface of the display panel 100, but is not bonded thereto.

According to the example embodiment of FIG. 11B, by making the sound separation partition portion 600 come in contact with the display panel without being bonded thereto, when a weak vibration is generated for outputting sound of a mid-high sound range, the sound separation partition portion performs a left and right sound separation function, and when there is a strong vibration in the low sound range, it is possible to reduce the amount of vibration attenuation to maintain a low sound characteristic.

That is, according to the example embodiment of FIG. 11B, a sound separation characteristic may be ensured in the mid-high sound range, and the pressure sound reduction in the low sound range may be reduced by utilizing a vibration plate in the low tone period.

According to the example embodiment of FIG. 11B, when the display panel vibrates weakly for outputting sound of mid-high sound range, the sound separation partition portion substantially absorbs the vibration and maintains the left and right sound separation characteristics. When the vibration plate is strongly vibrated for outputting sound of the low sound range, the sound separation partition portion absorbs only a part of the vibration, so that the entire display panel can be used as a vibration plate to maintain a low sound characteristic.

In detail, when the left and right sound generating actuators are vertically vibrated to strongly push the display panel upward for outputting low sound, the sound separation partition portion and the lower surface of the display panel are temporarily separated from each other, so that the entire display panel may be used as a vibration plate, and when the left and right sound generating actuators are vibrated downwardly to return to the original position thereof, the display panel comes into contact with the sound separation partition portion, so that the downward vibration may be partly suppressed to prevent sound quality degradation due to negative sound distortion or unbalanced vibration.

As illustrated in FIG. 11C, the sound separation partition portion 600 may have a height H1 that is larger than a gap T between the display panel 100 and the cover bottom 300.

That is, as illustrated in FIG. 11C, when it is assumed that the gap between the display panel 100 and the cover bottom 300 is T in a state where the display panel 100 is coupled to the cover bottom 300, the height H1 of the sound separation partition portion 600 may be equal to or larger than the gap T between the display panel 100 and the cover bottom 300.

Here, the height H1 of the sound separation partition portion 600 means the height before the sound separation partition is mounted between the display panel 100 and the cover bottom 300.

Accordingly, the sound separation partition portion 600 completely fills the gap between the display panel 100 and the cover bottom 300 such that the upper end surface of the sound separation partition portion 600 comes into contact with the lower surface of the display panel 100, and when the display panel 100 and the cover bottom 300 are assembled to each other, the sound separation partition portion 600 may be compressed to a certain extent.

As described above, by making the height H1 of the sound separation partition portion 600 larger than the gap T between the display panel 100 and the cover bottom 300, it may be possible to achieve the left and right sound separation function of the sound separation partition portion 600 as described above.

Meanwhile, when the difference between the height H1 of the sound separation partition portion 600 and the gap T between the display panel 100 and the cover bottom 300 is large, the sound separating characteristic may be improved and the sound distortion may be reduced, but the sound pressure in the low sound range may be somewhat deteriorated. On the contrary, when there is little difference between the height H1 of the sound separation partition portion 600 and the gap T between the display panel 100 and the cover bottom 300, the reduction of the sound pressure in the low sound range may be reduced, but the sound separation characteristic may be deteriorated.

Accordingly, by appropriately adjusting the height H1 of the sound separation partition portion 600 with respect to the gap T between the display panel 100 and the cover bottom 300, it is possible to reduce the sound distortion phenomenon and the sound pressure reduction in the low sound range while maintaining the sound separation characteristic.

Meanwhile, as shown in FIG. 11C, the sound separation partition portion 600 has a predetermined width W, which may be determined to be about 8 mm to 12 mm. When the width W of the sound separation partition portion is increased, the sound separation characteristic may be improved. Consequently, the sound output amount may be reduced by reducing the right and left vibration width, and when the width W is reduced, the required sound separation characteristic may not be maintained.

Accordingly, in the example embodiment, by adjusting the width W of the sound separation partition to about 8 mm to 12 mm, it may be possible to reduce the sound pressure reduction while maintaining the sound separation characteristic.

Figure 12A:
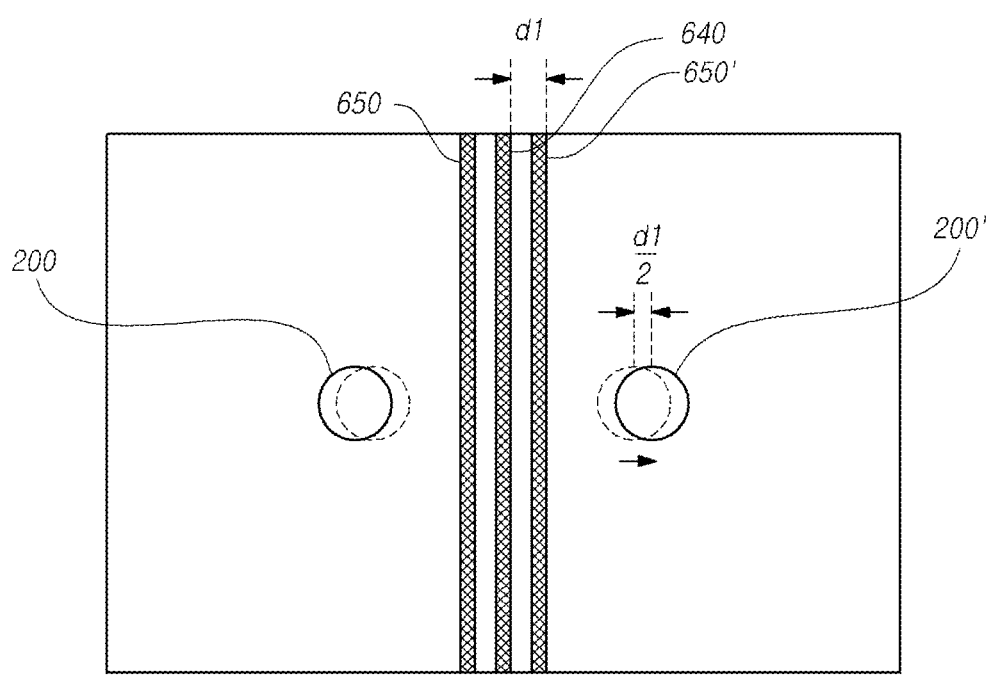
FIGS. 12A and 12B illustrate a sound separation partition portion having a triple wall structure as an example embodiment of the sound separation partition portion.
Figure 12B:
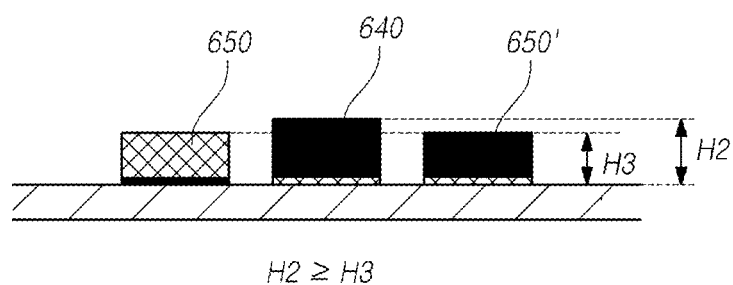

FIGS. 12A and 12B illustrate a sound separation partition portion having a triple wall structure as another example embodiment of the sound separation partition portion.

Meanwhile, when a single sound separation partition portion is used for left and right sound separation as illustrated in FIGS. 11A to 11C, the stereo sound characteristic may be improved. However, when a mono sound outputting the same sound in left and right is implemented, the sound pressure may be drastically reduced at a specific frequency due to left and right sound interference.

That is, when the mono acoustic is implemented in which the same sound is output from the left and right, because the display panel areas of the first air gap space and the second air gap space have the same vibration characteristic, the resonance phenomenon or interference phenomenon may be maximized in a predetermined frequency band so that a problem of drastically reducing the sound pressure may occur.

In consideration of this case, in the example embodiment of FIGS. 12A and 12B, the sound separation partition portion may be configured to have a triple wall structure that includes a central sound separation partition portion 640 and left and right sound separating partition portions 650 and 650' that are disposed at the left and right sides of the central sound separation partition portion 640 with a first distance d1 from the central sound separation partition 640.

As illustrated in FIGS. 12A and 12B, when the sound separation partition portion is formed in a triple wall structure, the right sound and left sound interference may be continuously attenuated in a wide area. Therefore, even when the left and right sound interference at a specific frequency is increased at a specific frequency in implementing mono sound, it may be possible to prevent the sudden reduction in the sound pressure, thereby preventing the sound characteristic from being discontinuously recognized. Of course, the sound separation partition portion is not necessarily limited to the triple wall structure, and may be a structure including two or more multiple partition parts.

In this case, as illustrated in FIG. 12A, the left or right sound generating actuator 200 or 200' may be disposed at a position displaced in the left or right direction by d½ from the position of the left or right sound generating actuator when a single sound separating partition portion is used.

Further, as illustrated in FIG. 12B, the height H2 of the center sound separation partition portion 640 may be equal to or larger than the height H3 of the left sound separation partition portion 650 or the right sound separation partition portion 650'.

With this configuration, when the left and right sound interference is small, the central sound separation partition portion 640 may mainly attenuates the interference, and when the left and right sound interference is increased so that the interference vibration is increased in a specific frequency band, the left and right sound separation partition portions 650 and 650' can absorb the interference vibration. Accordingly, it may be possible to appropriately cope with both the weak interference and the strong interference of left sound and right sound.

As described above, by forming the sound separation partition portion in a triple wall structure and increasing the height H2 of the central sound separation partition portion to be larger than the height H3 of the left and right sound separation partition portions, it may be possible to prevent the drastic sound pressure reduction phenomenon at a specific frequency by left and right sound interference at the time of implementing mono sound.

FIG. 13 illustrates sound generating characteristics in the case of using the example of FIG. 10 according to the example embodiment. As was illustrated in FIG. 10, the sound separation partition portion 600 was disposed at the center of the display panel 100, the distance 2d between the left and right sound generating actuators 200 and 200' was adjusted to about 400 mm or less, and the left and right sound generating actuators 200 and 200' were symmetrically disposed at the centers of the corresponding air gap spaces 800 and 800', respectively. Then the sound output characteristics at each frequency were measured, and the results are represented in FIG. 13.

The dotted line in FIG. 13 indicates a sound characteristic curve in the case where a sound separation partition portion is included, the entire display panel is used as a vibration plate, and the distance between left and right sound generating actuators is increased (e.g., the structure of FIG. 8A), and the solid line indicates a sound characteristic curve in the case where a part of the display panel is used as a vibration plate while setting the distance between the left and right sound generating actuators to be 400 mm or less (e.g., FIG. 10).

As illustrated in FIG. 13, it can be seen that the use of the example embodiment of FIG. 10 may significantly improve the dip phenomenon, which is a sound pressure reduction phenomenon in a mid-high sound range (several kHz to several tens of kHz), as compared with the example embodiment illustrated in FIGS. 8A to 8E (see area B in FIG. 13).

However, in the example embodiment of FIG. 10, the area of the display panel vibrated by the left and right sound generating actuators, that is, the size of each air gap space, may be reduced. As the area of the display panel utilized as the vibration plate is reduced, the output of the low sound range may be reduced as indicated by area C in FIG. 13.

Figure 14B:
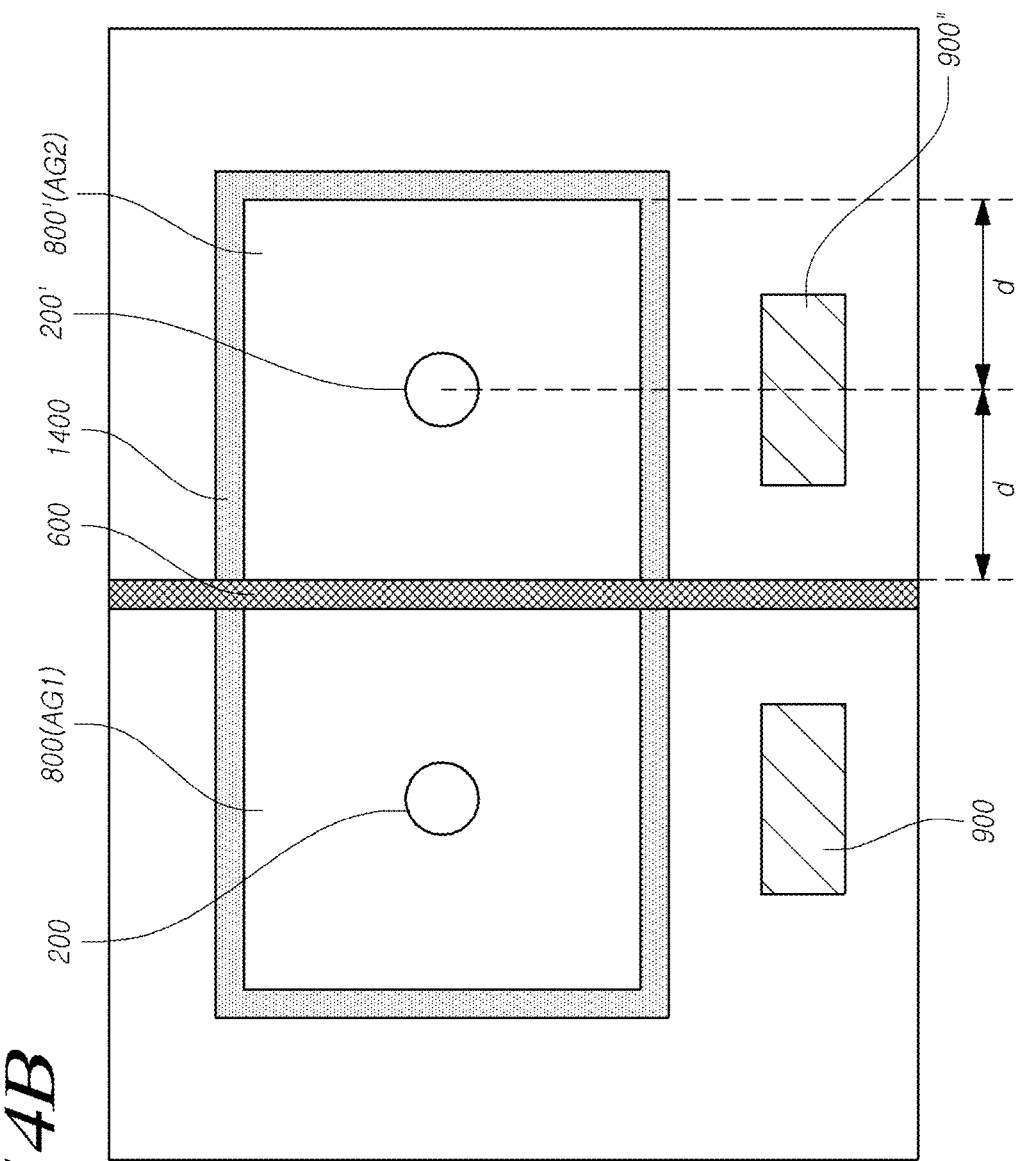

In order to solve the problem of weakening the low sound, the example embodiment illustrated in FIGS. 14A and 14B proposes a structure in which a separate low sound speaker is further disposed.

FIGS. 14A and 14B illustrate a structure further including a low sound speaker disposed outside the first air gap space AG1 and the second air gap space AG2, in addition to the sound generating actuator structure according to the example embodiment.

As described with reference to FIG. 13, when the example embodiment of FIG. 10 is used, there may be a possibility that a phenomenon in which the sound pressure of the low sound range decreases.

In order to solve this problem, the example embodiment of FIGS. 14A and 14B further includes a low sound speaker 900 disposed outside the sound generating structure, in addition to the sound generating structure including the left and right sound generating actuators.

That is, as illustrated in FIG. 14A, left and right sound generating actuators 200 and 200' and a baffle portion 1400 for forming air gap spaces 800 and 800' surrounding the actuators 200 and 200', as described with reference to FIG. 10, are formed in a part of a display panel, and at least one or more low sound speaker 900 is disposed outside the first air gap space 800 (AG1) and the second air gap space 800' (AG2).

Such a low sound speaker 900 may be a general type of speaker, or may be a woofer speaker that generates a sound of several kHz or less. Such a low sound speaker 900 may be disposed below the air gap spaces as illustrated in FIG. 14A. However, without being limited thereto, the low sound speaker may be disposed at a side of the air gap spaces or above the air gap spaces.

In addition, only one low sound speaker 900 may be disposed without separating left and right, but two or more low sound speakers may be arranged on the left and right sides to separate left and right sounds of the low sound range. That is, as illustrated in FIG. 14B, the sound separation partition portion 600 may be formed to extend to the lower portion of the air gap spaces 800 and 800'. Further, a left low sound speaker 900 and a right low sound speaker 900' may be respectively disposed on the left and right sides of the sound separation partition portion 600 formed to extend as described above.

The low sound speakers arranged in this manner may reduce the sound pressure reduction phenomenon of the low sound range, which may be caused in the example embodiment as illustrated in FIG. 10, to maintain the sound output characteristic in the entire sound range. For example, when left and right low sound speakers are provided, there is an advantage in that stereo sound can be implemented even in the low sound range.

Figure 15:
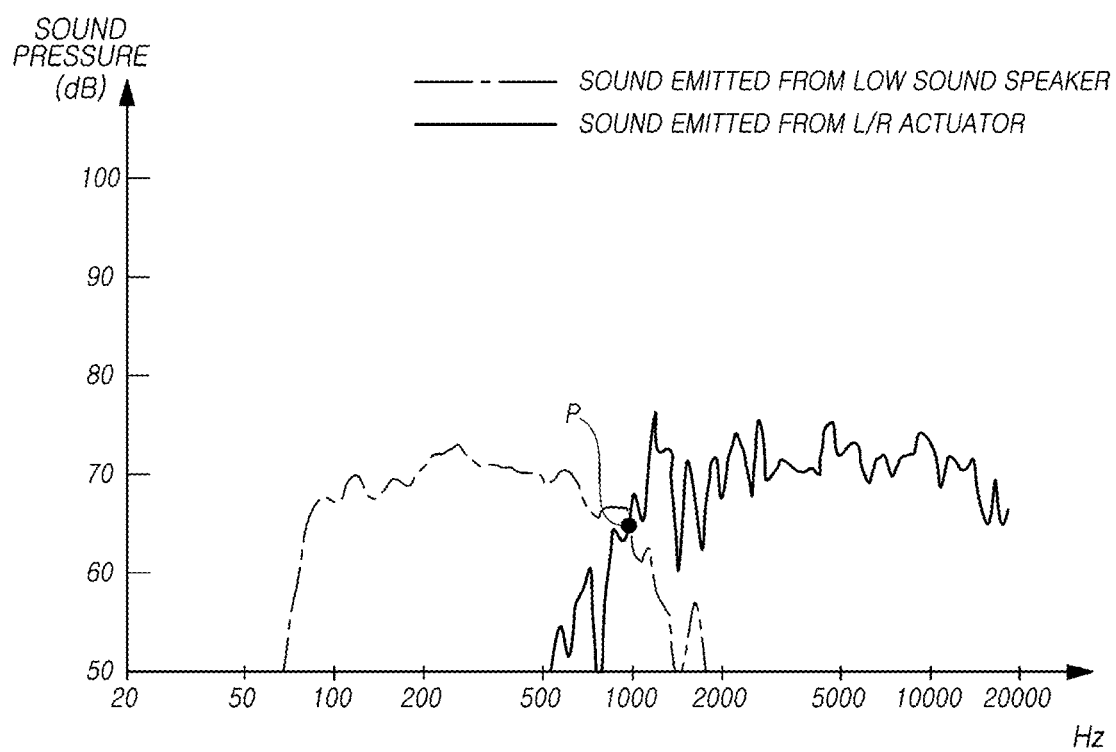
FIG. 15 illustrates sound generating characteristics when the example embodiment of FIGS. 14A and 14B is used, in which a sound characteristic curve obtained by the low sound speaker, a sound characteristic curve obtained by the sound generating actuator, and a phenomenon in which the two characteristic curves intersect at an intersection P are illustrated.

FIG. 15 illustrates sound generating characteristics when the example embodiment of FIGS. 14A and 14B is used, in which a sound characteristic curve obtained by the low sound speaker, a sound characteristic curve obtained by the sound generating actuator, and a phenomenon in the two sound characteristic curves intersect at an intersection P are illustrated.

In FIG. 15, the one-dot chain line is a sound characteristic curve obtained by a low sound speaker (woofer speaker), and the solid line is a sound characteristic curve of the sound output device having left and right sound generating actuators according to the example embodiment illustrated in FIG. 10.

As shown in FIG. 15, the sound characteristic curves of the embodiment of FIG. 10 indicates that the sound pressure is increased at about 1 kHz to output sound to be equal to or higher than a predetermined level up to about 20 kHz, and the low sound speaker has a characteristic of emitting low sound in the frequency band of about 100 Hz to 2000 Hz.

At this time, the intersection point P of the sound characteristic curve obtained by the left and right sound generating actuators according to the embodiment of FIG. 10 and the sound characteristic curve obtained by a low sound speaker is formed in the frequency band of about 1 kHz to 1.5 kHz.

As described above, when a separate low sound speaker is further provided in addition to a panel vibration type sound generating structure and the sound generating actuator and the low sound speaker are configured to cross over at about 1 kHz to 1.5 kHz, there may be an advantage in that the stereo sense may be maximized while ensuring a sound output of a predetermined level or more in the entire frequency band.

As described above, according to the example embodiment, it may be possible to realize excellent stereo sound in a panel vibration type sound generating display device by including left and right sound generating actuators disposed at predetermined left and right positions in a display panel, and a sound separation partition portion disposed between the left and right sound generating actuators, as well as a baffle portion surrounding the periphery of the left and right sound generating actuators together with the sound separation partition portion.

Also, it may be possible to improve left and right stereo sound implementation characteristics by forming the central sound separation partition portion between the left and right sound generating actuators, adjusting, for example, the height and number of the sound separation partition portions, and determining whether to bond or not the sound separation partition portions to the display panel.

Further, by adjusting the distance between the sound separation partition portion disposed at the center of the display panel and the left and right sound generating actuators for realizing left and right stereo sound to be 200 mm or less, it may be possible to reduce the dip phenomenon that is a sound quality reduction phenomenon in the mid-high sound range.

By arranging the sound separation partition portion and the baffle portion to form the first and second air gap spaces are symmetrically formed around the left and right sound generating actuators, the stereo sound characteristic, and the durability and reliability of the sound generating device can be ensured.

Also, by further arranging a low sound speaker at one side of a left and right sound generating actuator structure for generating sound of a mid-high sound range by directly vibrating the display panel, it may be possible to obtain excellent sound output characteristics in the entire audible frequency band.

Further, by fixing sound generating actuators to the support holes formed in the support portion of the display device, it may be possible to reduce the thickness of the display device while ensuring an excellent sound generating performance.

According to one or more example embodiments of the present disclosure, a display device includes a display panel, sound generating actuators including a first sound generating actuator in a first area of the display panel and a second sound generating actuator in a second area of the display panel, the first and second sound generating actuators configured to vibrate the display panel to generate sound, and a partition between the first sound generating actuator and the second sound generating actuator.

According to one or more example embodiments of the present disclosure, the display device may further include a support portion configured to support a rear portion of the display panel.

According to one or more example embodiments of the present disclosure, the partition may separate sound between the first and second areas.

According to one or more example embodiments of the present disclosure, the partition may be in contact with the display panel and the support portion.

According to one or more example embodiments of the present disclosure, the partition may extend in a vertical direction of the display panel.

According to one or more example embodiments of the present disclosure, the sound generating actuator may comprise a lower plate, a magnet on the lower plate, a center pole at the center of the lower plate, a bobbin surrounding the center pole, and a coil wound around the bobbin.

According to one or more example embodiments of the present disclosure, a distance between the partition and the first sound generating actuator or the second sound generating actuator may be 100 nm or more.

According to one or more example embodiments of the present disclosure, the support portion may include a cover bottom, the partition is between an upper surface of the cover bottom and a lower surface of the display panel, and the partition may be bonded to at least the upper surface of the cover bottom.

According to one or more example embodiments of the present disclosure, the partition my be in contact with the lower surface of the display panel in a non-adhesion structure.

According to one or more example embodiments of the present disclosure, the display device may further include baffles that respectively surround a periphery of the first sound generating actuator and the second sound generating actuator to form first and second spaces around the first sound generating actuator and the second sound generating actuator together with the partition.

According to one or more example embodiments of the present disclosure, the first sound generating actuator may be at a center of a left and right length of the first space, and the second sound generating actuator may be at a center of a left and right length of the second space.

According to one or more example embodiments of the present disclosure, the first sound generating actuator may be at a center of a vertical length of the first space, and the second sound generating actuator may be at a center of a vertical length of the second space.

According to one or more example embodiments of the present disclosure, the partition may have a multi-wall structure including first and second sound separation portions at first and second sides of a center of the display panel and at a first distance from the center of the display panel.

According to one or more example embodiments of the present disclosure, the display device may further include baffles that respectively surround a periphery of the first sound generating actuator and the second sound generating actuator to form first and second spaces around the first sound generating actuator and the second sound generating actuator with the partition, and at least one low sound speaker outside the first space and the second space.

According to one or more example embodiments of the present disclosure, the at least one low sound speaker may include a first low sound speaker at the first side of the partition and a second low sound speaker at the second side of the partition.

According to one or more example embodiments of the present disclosure, sound of a mid-high sound range may be emitted by the sound generating actuators, sound of a low sound range may be emitted by the low sound speaker, and a frequency of an intersection point of a sound characteristic curve by the actuators and a sound characteristic curve by the low sound speaker may be 1 kHz-1.5 kHz.

According to one or more example embodiments of the present disclosure, the first or second sound generating actuator may be inserted into a support hole provided in the support portion to be fixed to the support portion.

According to one or more example embodiments of the present disclosure, the first or second sound generating actuator may include at least one of a lower plate inserted into the support hole, a magnet on the lower plate, a center pole at a center of the lower plate, a bobbin to surround a periphery of the center pole and having a tip end in contact with the display panel, and a coil wound around an outer periphery of the bobbin.

According to one or more example embodiments of the present disclosure, the lower plate may further include an extension portion extending outwardly, and the extension portion may be fixed to the lower surface of the support portion.

According to one or more example embodiments of the present disclosure, the display device may further include baffles that respectively surround a periphery of the first sound generating actuator and the second sound generating actuator to form first and second spaces around the first sound generating actuator and the second sound generating actuator together with the partition, the baffles may include at least one of an adhesive member bonded to an upper surface of the support portion or a lower surface of the display panel, and a sealing portion between the upper surface of the support portion and the lower surface of the display panel.

According to one or more example embodiments of the present disclosure, the partition may extend in the vertical direction of the display panel at a center between the first sound generating actuator and the second sound generating actuator.

According to one or more example embodiments of the present disclosure, a support hole may be formed through the support portion.

According to one or more example embodiments of the present disclosure, the sound generating actuator may be fixed in the support hole.

According to one or more example embodiments of the present disclosure, a display device includes a display panel, sound generating actuators in a first area of the display panel and a second area of the display panel, the sound generating actuators configured to vibrate the display panel to generate sound, at least one of the first and second areas includes two or more sound generating actuators, and a partition between the first and second areas.

According to one or more example embodiments of the present disclosure, a display device includes a display panel, sound generating actuators in a first area of the display panel and a second area of the display panel, the sound generating actuators configured to vibrate the display panel to generate sound, a speaker outside the first area and the second area.

According to one or more example embodiments of the present disclosure, the speaker may be configured to generate sound in a different range from the sound generating actuators.

Configurations in accordance with embodiments of the present disclosure may provide a number of attributes. For example, a panel vibration type display device is capable of generating sound by directly vibrating a display panel constituting the display device, and outputting different sounds to left and right so as to implement stereo sound.

Further, a panel vibration type display device may include left and right sound generating actuators disposed at predetermined left and right positions in a display panel, and a sound separation partition portion disposed between the left and right sound generating actuators, as well as a baffle portion surrounding the periphery of the left and right sound generating actuators together with the sound separation partition portion.

Additionally, a display panel may be formed by one or more sound separation partition portions in a central portion between two or more sound generating actuators disposed in the left and right portions of the display panel, adjusting the height and number of the sound separation partition portions, and determining whether to bond the sound separation partition portions to the display panel.

Also, a display device may include adjusting the distance between the sound separation partition portion disposed at the center of the display panel and the left and right sound generating actuators for implementing the left and right stereo sound to be 200 mm or less.

Furthermore, a display device may include arranging the sound separation partition portion and the baffle portion to form the first and second air gap spaces are symmetrically formed around the left and right sound generating actuators.

In addition, a display device may include further arranging a low sound speaker at one side of a left and right sound generating actuator structure that generates sound of a mid-high sound range by directly vibrating a display panel.

It will be apparent to those skilled in the art that various modifications and variations may be made in the present disclosure without departing from the technical idea or scope of the disclosure. Thus, it is intended that embodiments of the present disclosure cover the modifications and variations of the disclosure provided they come within the scope of the appended claims and their equivalents.

What is claimed is:

1. A display device, comprising:
   a display panel configured to display an image by emitting light;
   sound generating actuators including a first sound generating actuator in a first area of the display panel and a second sound generating actuator in a second area of the display panel, the first and second sound generating actuators configured to vibrate the display panel to generate sound;
   a partition between the first sound generating actuator and the second sound generating actuator; and a support portion configured to support a rear portion of the display panel, wherein the partition is in contact with the display panel and the support portion; and wherein the first or second sound generating actuator is inserted into a support hole provided in the support portion to be fixed to the support portion.

2. The display device according to claim 1, wherein the partition separates sound between the first and second areas.

3. The display device according to claim 1, wherein the partition extends in a vertical direction of the display panel.

4. The display device according to claim 1, wherein the sound generating actuator comprises:
a lower plate;
a magnet on the lower plate;
a center pole at the center of the lower plate;
a bobbin surrounding the center pole; and
a coil wound around the bobbin.

5. The display device of claim 4, wherein the lower plate further includes an extension portion extending outwardly, and wherein the extension portion is fixed to the lower surface of the support portion.

6. The display device of claim 1, wherein a distance between the partition and the first sound generating actuator or the second sound generating actuator is 100 mm or more.

7. The display device of claim 1, wherein the support portion includes a cover bottom, the partition is between an upper surface of the cover bottom and a lower surface of the display panel, and the partition is bonded to at least the upper surface of the cover bottom.

8. The display device of claim 7, wherein the partition is in contact with the lower surface of the display panel in a non-adhesion structure.

9. The display device of claim 1, further comprising:
baffles that respectively surround a periphery of the first sound generating actuator and the second sound generating actuator to form first and second spaces around the first sound generating actuator and the second sound generating actuator together with the partition.

10. The display device of claim 9, wherein the first sound generating actuator is at a center of a left and right length of the first space, and the second sound generating actuator is at a center of a left and right length of the second space.

11. The display device of claim 10, wherein the first sound generating actuator is at a center of a vertical length of the first space, and the second sound generating actuator is at a center of a vertical length of the second space.

12. The display device of claim 1, wherein the partition has a multi-wall structure including first and second sound separation portions at first and second sides of a center of the display panel and at a first distance from the center of the display panel.

13. The display device of claim 1, further comprising:
baffles that respectively surround a periphery of the first sound generating actuator and the second sound generating actuator to form first and second spaces around the first sound generating actuator and the second sound generating actuator with the partition; and
at least one low sound speaker outside the first space and the second space.

14. The display device of claim 13, wherein the at least one low sound speaker includes a first low sound speaker at the first side of the partition and a second low sound speaker at the second side of the partition.

15. The display device of claim 13, wherein sound of a mid-high sound range is emitted by the sound generating actuators, sound of a low sound range is emitted by the low sound speaker, and a frequency of an intersection point of a sound characteristic curve by the actuators and a sound characteristic curve by the low sound speaker is 1 kHz-1.5 kHz.

16. The display device of claim 1, further comprising:
baffles that respectively surround a periphery of the first sound generating actuator and the second sound generating actuator to form first and second spaces around the first sound generating actuator and the second sound generating actuator together with the partition,
wherein the baffles include at least one of an adhesive member bonded to an upper surface of the support portion or a lower surface of the display panel, and a sealing portion between the upper surface of the support portion and the lower surface of the display panel.

17. The display device of claim 1, wherein the partition extends in the vertical direction of the display panel at a center between the first sound generating actuator and the second sound generating actuator.

18. The display device of claim 1,
wherein the sound generating actuators are in contact with the display panel and the support portion.

19. A display device, comprising:
a display panel configured to display an image by emitting light;
sound generating actuators in a first area of the display panel and a second area of the display panel, the sound generating actuators configured to vibrate the display panel to generate sound,
wherein at least one of the first and second areas includes two or more sound generating actuators;
a partition between the first and second areas; and
a support portion configured to support a rear portion of the display panel,
wherein the partition is in contact with the display panel and the support portion; and
wherein at least one of the sound generating actuators is inserted into a support hole provided in the support portion to be fixed to the support portion.

20. The display device of claim 19, further comprising:
a speaker outside the first area and the second area.

21. The display device according to claim 20, wherein the speaker is configured to generate sound in a different range from the sound generating actuators.

22. The display device of claim 19,
wherein the sound generating actuators are in contact with the display panel and the support portion.

23. A display device, comprising:
a display panel configured to display an image by emitting light;
sound generating actuators including a first sound generating actuator in a first area of the display panel and a second sound generating actuator in a second area of the display panel, the first and second sound generating actuators configured to vibrate the display panel to generate sound; and
a partition between the first sound generating actuator and the second sound generating actuator,
wherein at least one of the first and second sound generating actuators includes:
a lower plate;
a magnet on the lower plate;
a center pole at the center of the lower plate;
a bobbin surrounding the center pole; and
a coil wound around the bobbin.

* * * * *